(12) United States Patent
Briod et al.

(10) Patent No.: US 11,708,160 B2
(45) Date of Patent: Jul. 25, 2023

(54) UNMANNED AERIAL VEHICLE WITH PROTECTIVE OUTER CAGE

(71) Applicant: Flyability SA, Lausanne (CH)

(72) Inventors: Adrien Briod, Lausanne (CH); Arnaud Garnier, Lausanne (CH); Ludovic Daler, Lausanne (CH); Alexandre Pabouctsidis, Lausanne (CH)

(73) Assignee: FLYABILITY SA, Lausanne (CH)

( * ) Notice: Subject to any disclaimer, the term of this patent is extended or adjusted under 35 U.S.C. 154(b) by 590 days.

(21) Appl. No.: 16/643,848

(22) PCT Filed: Sep. 4, 2018

(86) PCT No.: PCT/EP2018/073783
§ 371 (c)(1),
(2) Date: Mar. 3, 2020

(87) PCT Pub. No.: WO2019/048439
PCT Pub. Date: Mar. 14, 2019

(65) Prior Publication Data
US 2021/0061463 A1    Mar. 4, 2021

(30) Foreign Application Priority Data
Sep. 5, 2017    (EP) .................................... 17189515

(51) Int. Cl.
*B64C 39/02* (2023.01)
*B60L 50/60* (2019.01)
(Continued)

(52) U.S. Cl.
CPC ............ *B64C 39/024* (2013.01); *B60L 50/60* (2019.02); *B64D 27/24* (2013.01); *B64D 47/02* (2013.01);
(Continued)

(58) Field of Classification Search
CPC ............ B64C 39/024; B64C 2201/027; B64C 2201/042; B64C 2201/108;
(Continued)

(56) References Cited

U.S. PATENT DOCUMENTS 3,141,479 A * 7/1964 Mickey .................... C23D 5/00
138/146
3,350,035 A * 10/1967 Schlieben ............... B64C 29/02
244/7 R
(Continued)

FOREIGN PATENT DOCUMENTS

EP    3 141 479 A2    3/2017
JP    2017035996 A    2/2017
(Continued)

OTHER PUBLICATIONS

European Patent Office/ISA, International Search Report and Written Opinion for PCT Application No. PCT/EP2018/073783, dated Oct. 9, 2018. 14 pages.

*Primary Examiner* — Medhat Badawi
(74) *Attorney, Agent, or Firm* — SoCal IP Law Group LLP; Angelo Gaz

(57) ABSTRACT

Unmanned aerial vehicle (UAV) including an inner frame, an inner flight propulsion system mounted on the inner frame, an outer frame, a gimbal system comprising at least two rotational couplings coupling the inner propulsion system to the outer frame, a control system, a power source, and an outer frame actuation system configured to actively orient the outer frame with respect to the inner frame.

27 Claims, 17 Drawing Sheets

(51) Int. Cl.
*B64D 27/24* (2006.01)
*B64D 47/02* (2006.01)
*B64D 47/08* (2006.01)
*B64U 10/13* (2023.01)
*B64U 30/20* (2023.01)
*B64U 50/19* (2023.01)

(52) U.S. Cl.
CPC .......... *B64D 47/08* (2013.01); *B60L 2200/10* (2013.01); *B64U 10/13* (2023.01); *B64U 30/20* (2023.01); *B64U 50/19* (2023.01)

(58) Field of Classification Search
CPC ........ B64C 2201/128; B64C 2201/146; B64C 2201/165; B64C 27/20; B60L 50/60; B60L 2200/10; B64D 27/24; B64D 47/02; B64D 47/08; Y02T 10/70; B64U 10/13; B64U 30/20; B64U 50/19; B64U 50/13; B64U 2101/60; B64U 2201/20
See application file for complete search history.

(56) References Cited

U.S. PATENT DOCUMENTS

| | | | | |
|---|---|---|---|---|
| 3,371,794 A * | 3/1968 | Johnson | B04C 5/28 | 55/459.1 |
| 3,378,037 A * | 4/1968 | Carpenter | C22B 21/064 | 138/146 |
| 3,422,856 A * | 1/1969 | Hunter | F16L 58/1063 | 138/DIG. 6 |
| 3,558,081 A * | 1/1971 | Williams | B64C 27/10 | 244/17.19 |
| 3,568,723 A * | 3/1971 | Sowards | F01N 13/14 | 138/143 |
| 3,633,849 A * | 1/1972 | Kling | B64C 27/20 | 244/23 C |
| 3,830,173 A * | 8/1974 | Hubble | C04B 28/26 | 138/146 |
| 4,505,346 A * | 3/1985 | Mueller | B62D 57/04 | 446/178 |
| 5,052,979 A * | 10/1991 | Welschof | B60B 27/0005 | 464/178 |
| 6,349,542 B1 * | 2/2002 | Moore, III | F01N 13/10 | 138/143 |
| 6,402,088 B1 * | 6/2002 | Syrovy | B64C 27/28 | 244/17.11 |
| 6,725,656 B2 * | 4/2004 | Moore, III | F01N 13/102 | 428/114 |
| 6,976,899 B1 * | 12/2005 | Tamanas | B62D 57/04 | 446/454 |
| 7,273,195 B1 * | 9/2007 | Golliher | A63H 27/12 | 244/17.11 |
| 7,412,956 B2 * | 8/2008 | Gotou | F15B 15/1428 | 123/193.2 |
| 7,905,447 B2 * | 3/2011 | Stroud | B64C 27/32 | 416/129 |
| 8,109,802 B2 * | 2/2012 | Chui | A63H 27/12 | 446/36 |
| 8,147,289 B1 | 4/2012 | Lee | | |
| D659,771 S | 5/2012 | Seydoux et al. | | |
| 8,464,978 B2 * | 6/2013 | Yim | B64C 27/20 | 244/17.23 |
| 8,528,854 B2 * | 9/2013 | Yan | A63H 33/005 | 244/119 |
| 8,695,919 B2 * | 4/2014 | Shachor | B64F 1/12 | 244/17.11 |
| 9,061,558 B2 * | 6/2015 | Kalantari | B60F 5/02 | |
| 9,067,667 B2 * | 6/2015 | Yan | B64C 27/10 | |
| 9,150,069 B2 | 10/2015 | Kalantari et al. | | |
| 9,458,954 B2 * | 10/2016 | Baur | F16L 7/00 | |
| 9,611,032 B2 * | 4/2017 | Briod | B64C 17/00 | |
| 9,725,170 B2 * | 8/2017 | Daler | B64D 45/04 | |
| 9,760,087 B2 * | 9/2017 | Hoareau | G08G 5/0026 | |
| 9,868,524 B2 * | 1/2018 | Welsh | B64C 27/20 | |
| 9,889,930 B2 * | 2/2018 | Welsh | B64C 39/024 | |
| 10,099,783 B1 * | 10/2018 | Nilson | B64C 17/02 | |
| 10,118,697 B2 * | 11/2018 | Weissenberg | B64C 27/006 | |
| 10,165,256 B2 * | 12/2018 | Grenier | H04N 13/243 | |
| 10,252,795 B2 * | 4/2019 | Kornatowski | B64C 27/20 | |
| 10,435,147 B2 * | 10/2019 | Allen | G05D 1/0858 | |
| 10,464,661 B2 * | 11/2019 | D'Andrea | G05D 1/0072 | |
| 10,577,098 B2 * | 3/2020 | Chang | B64C 37/02 | |
| D890,267 S * | 7/2020 | Liao | D21/443 | |
| 10,870,487 B2 * | 12/2020 | McCullough | B64D 25/12 | |
| 10,901,433 B2 * | 1/2021 | Youmans | B64C 39/026 | |
| 10,988,241 B2 * | 4/2021 | Santangelo | B64C 27/006 | |
| 11,021,240 B2 * | 6/2021 | Lee | B64C 27/006 | |
| 11,141,467 B2 * | 10/2021 | Gruskin | C12N 5/0634 | |
| 11,148,808 B2 * | 10/2021 | Wiggerich | B64D 1/22 | |
| 11,158,029 B2 * | 10/2021 | Attariwala | G01R 33/565 | |
| 11,260,971 B2 * | 3/2022 | Weller | B64C 39/024 | |
| 11,332,244 B2 * | 5/2022 | Kuroiwa | B64C 39/024 | |
| 2008/0215037 A1 * | 9/2008 | Petrakis | G01K 5/483 | 604/890.1 |
| 2009/0075551 A1 * | 3/2009 | Chui | A63H 27/12 | 446/36 |
| 2010/0224723 A1 * | 9/2010 | Apkarian | A63H 27/12 | 244/65 |
| 2010/0264256 A1 * | 10/2010 | Yim | B64C 27/52 | 416/123 |
| 2014/0014767 A1 * | 1/2014 | Yan | A63H 30/04 | 244/119 |
| 2014/0090493 A1 * | 4/2014 | Fahnline | G01C 19/08 | 74/5.7 |
| 2015/0293138 A1 * | 10/2015 | Briod | G01C 22/00 | 702/142 |
| 2015/0343900 A1 * | 12/2015 | Schlangen | B62D 25/20 | 180/247 |
| 2015/0360776 A1 * | 12/2015 | Briod | B64C 17/00 | 244/23 A |
| 2016/0001875 A1 * | 1/2016 | Daler | B64C 17/00 | 244/17.11 |
| 2016/0023755 A1 * | 1/2016 | Elshafei | B64C 29/0033 | 244/17.23 |
| 2016/0107751 A1 * | 4/2016 | D'Andrea | G05D 1/0072 | 701/4 |
| 2016/0122016 A1 * | 5/2016 | Mintchev | B64C 39/024 | 244/17.23 |
| 2016/0152321 A1 * | 6/2016 | D'Andrea | B64C 13/24 | 701/3 |
| 2016/0375983 A1 * | 12/2016 | Yan | G05D 1/0094 | 701/4 |
| 2017/0050726 A1 * | 2/2017 | Yamada | B64D 1/22 | |
| 2017/0057630 A1 * | 3/2017 | Schwaiger | B64C 27/20 | |
| 2017/0233072 A1 * | 8/2017 | Chang | B64D 47/08 | 244/2 |
| 2017/0247107 A1 * | 8/2017 | Hauer | B64C 27/12 | |
| 2017/0297679 A1 * | 10/2017 | Elliott | B64D 35/08 | |
| 2018/0120831 A1 * | 5/2018 | Jacksy | G05D 1/0206 | |
| 2018/0155009 A1 * | 6/2018 | Mueller | B64C 13/24 | |
| 2018/0257774 A1 * | 9/2018 | Volpi | B25J 13/02 | |
| 2019/0337616 A1 * | 11/2019 | Benedict | B64C 39/005 | |
| 2021/0061463 A1 * | 3/2021 | Briod | B64D 47/02 | |
| 2022/0097865 A1 * | 3/2022 | Sidoti | A63H 27/12 | |

FOREIGN PATENT DOCUMENTS

| | | |
|---|---|---|
| JP | 2017136914 A | 8/2017 |
| WO | 2004113166 A1 | 12/2004 |
| WO | 2014198642 A1 | 12/2014 |
| WO | 2014198774 A1 | 12/2014 |
| WO | 2015022455 A1 | 2/2015 |
| WO | 2015105554 A1 | 7/2015 |
| WO | 2015135951 A1 | 9/2015 |
| WO | 2016140987 A1 | 9/2016 |

* cited by examiner

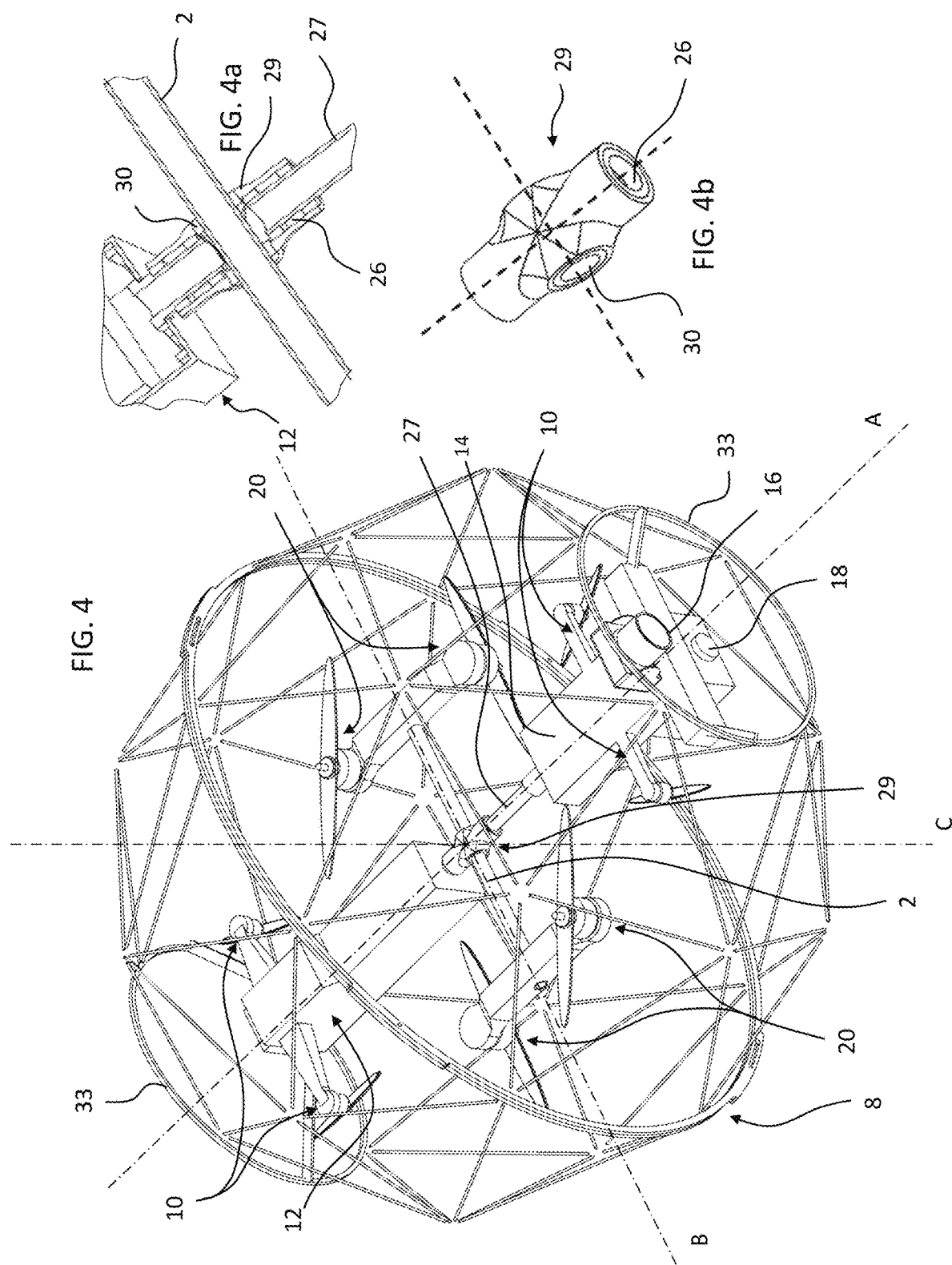

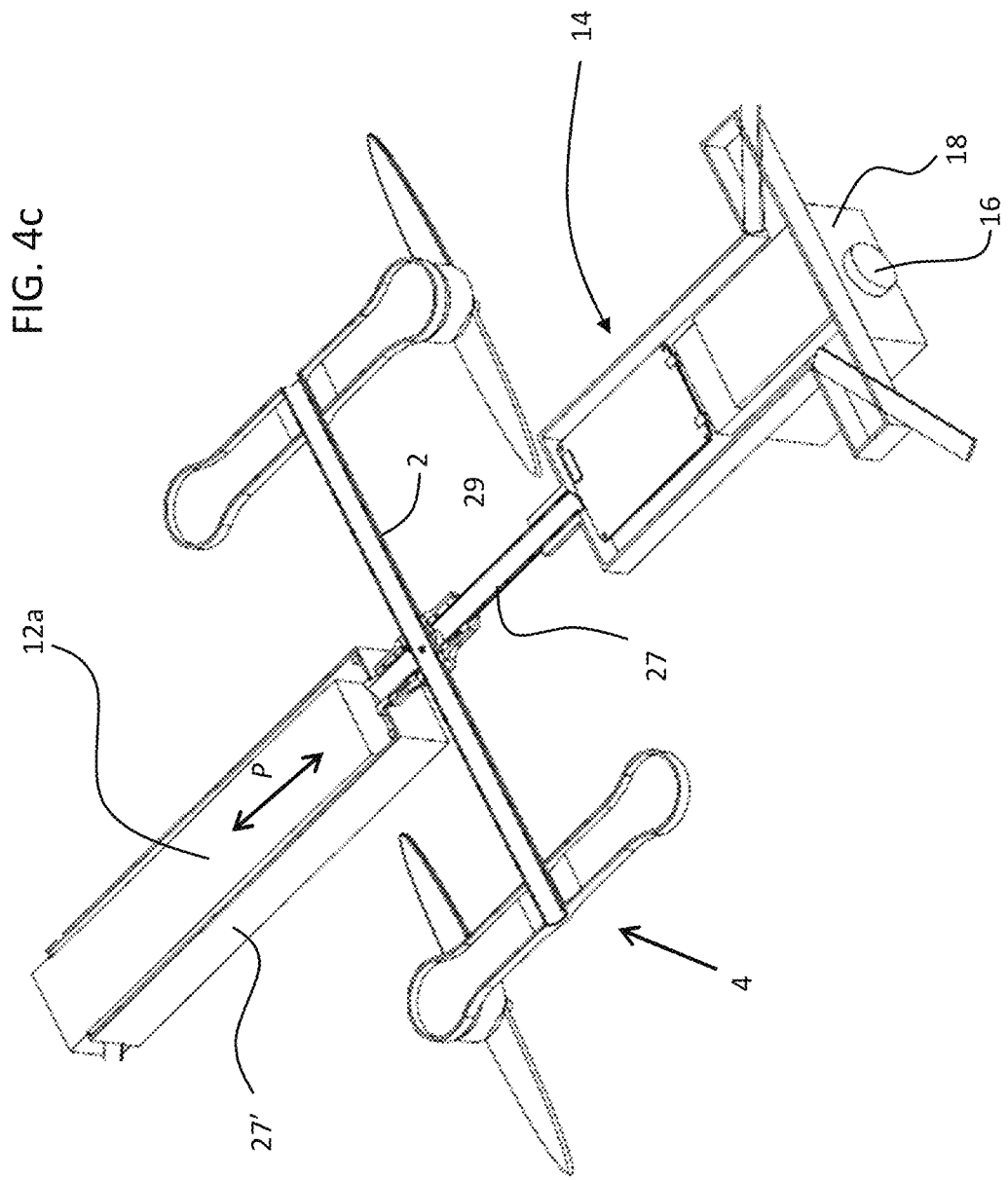

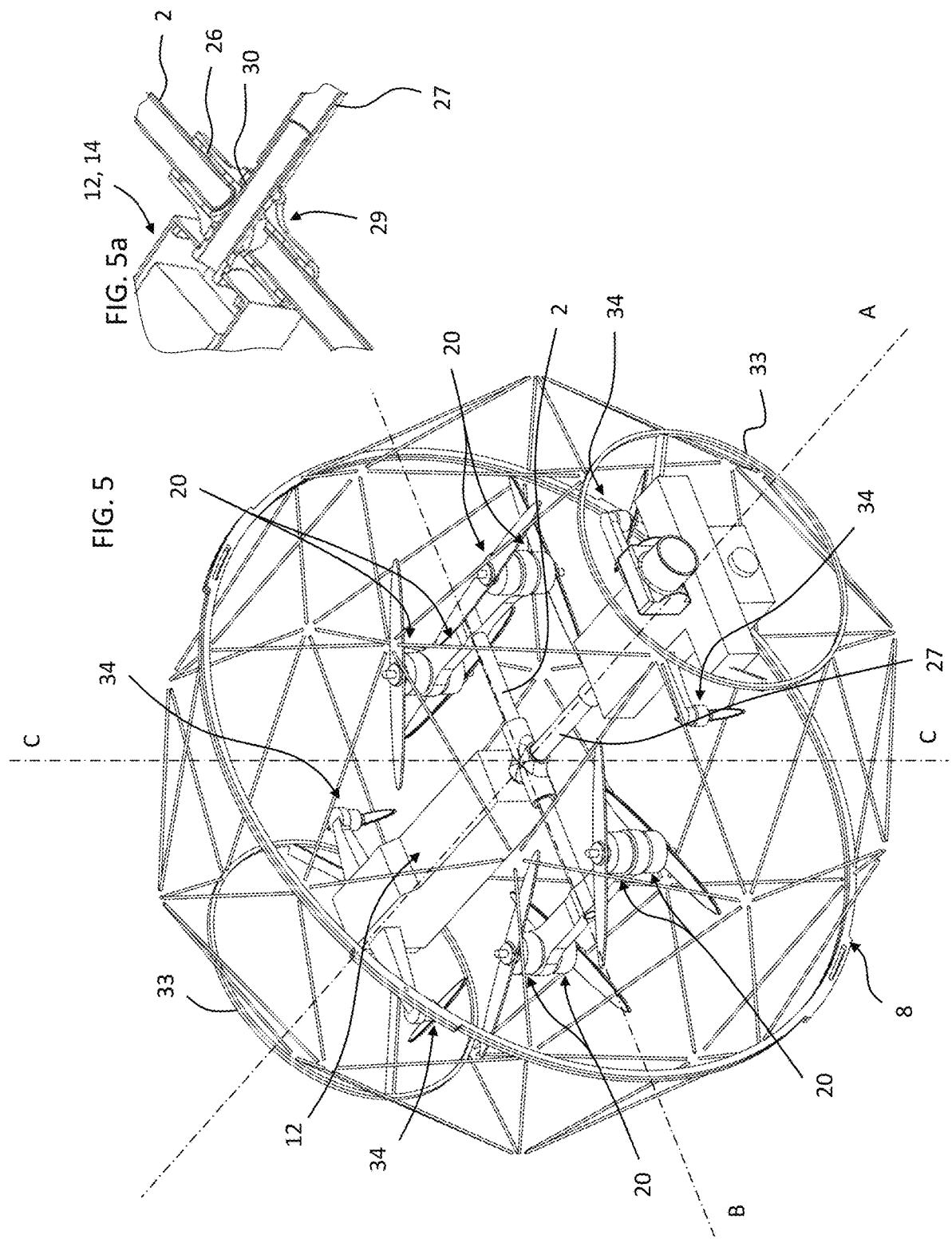

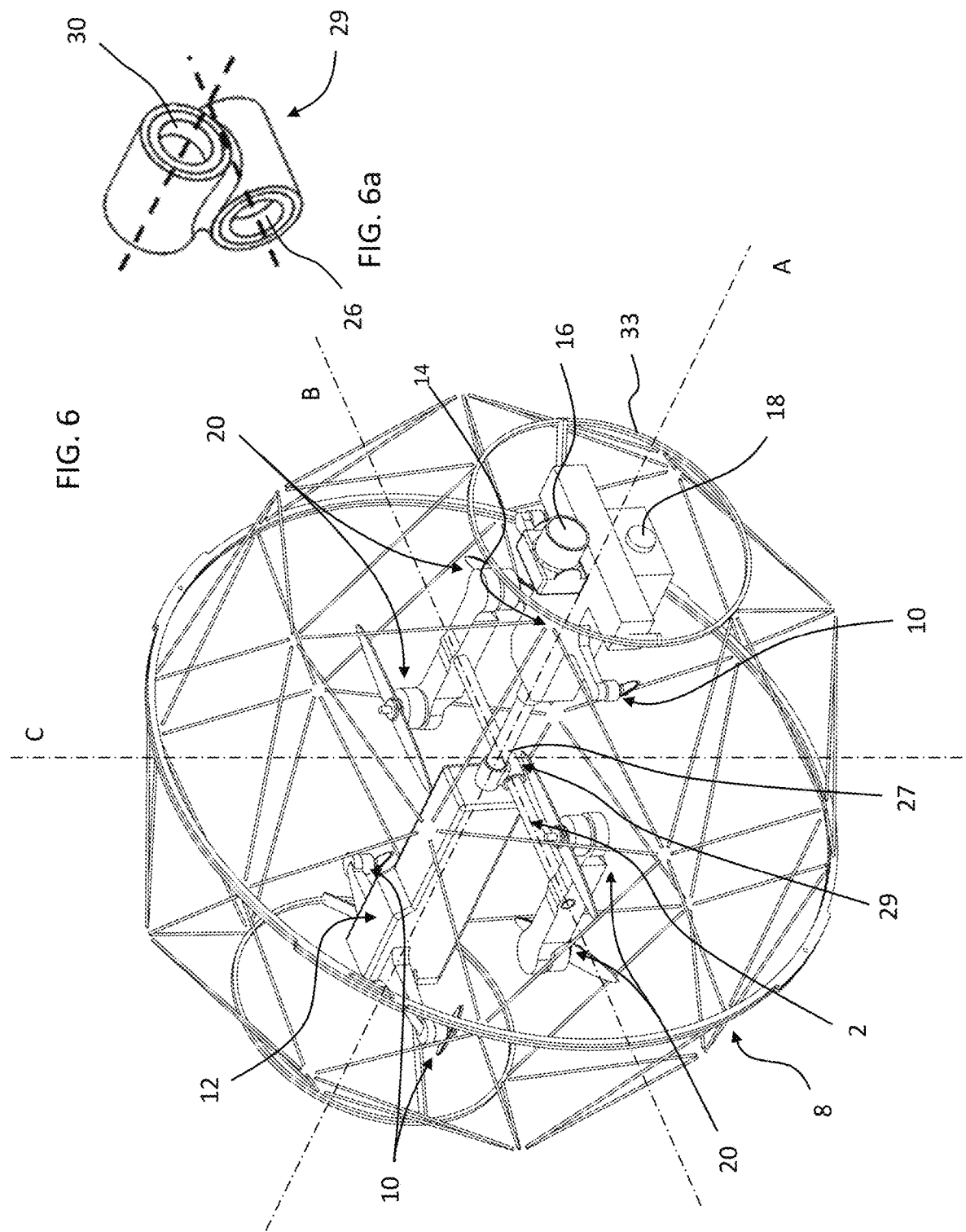

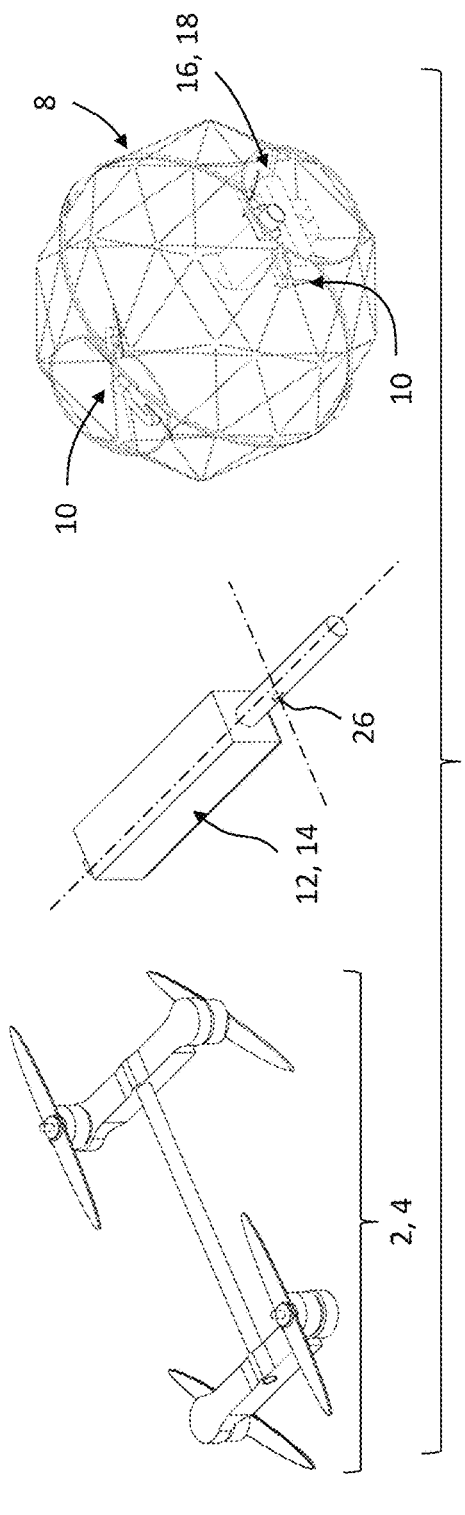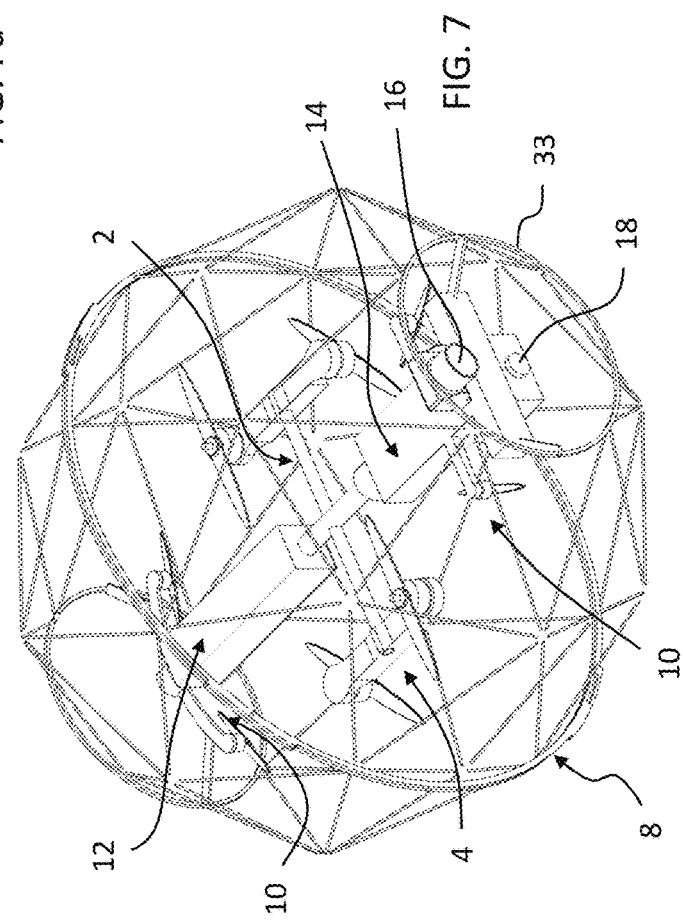
FIG. 7a
FIG. 7

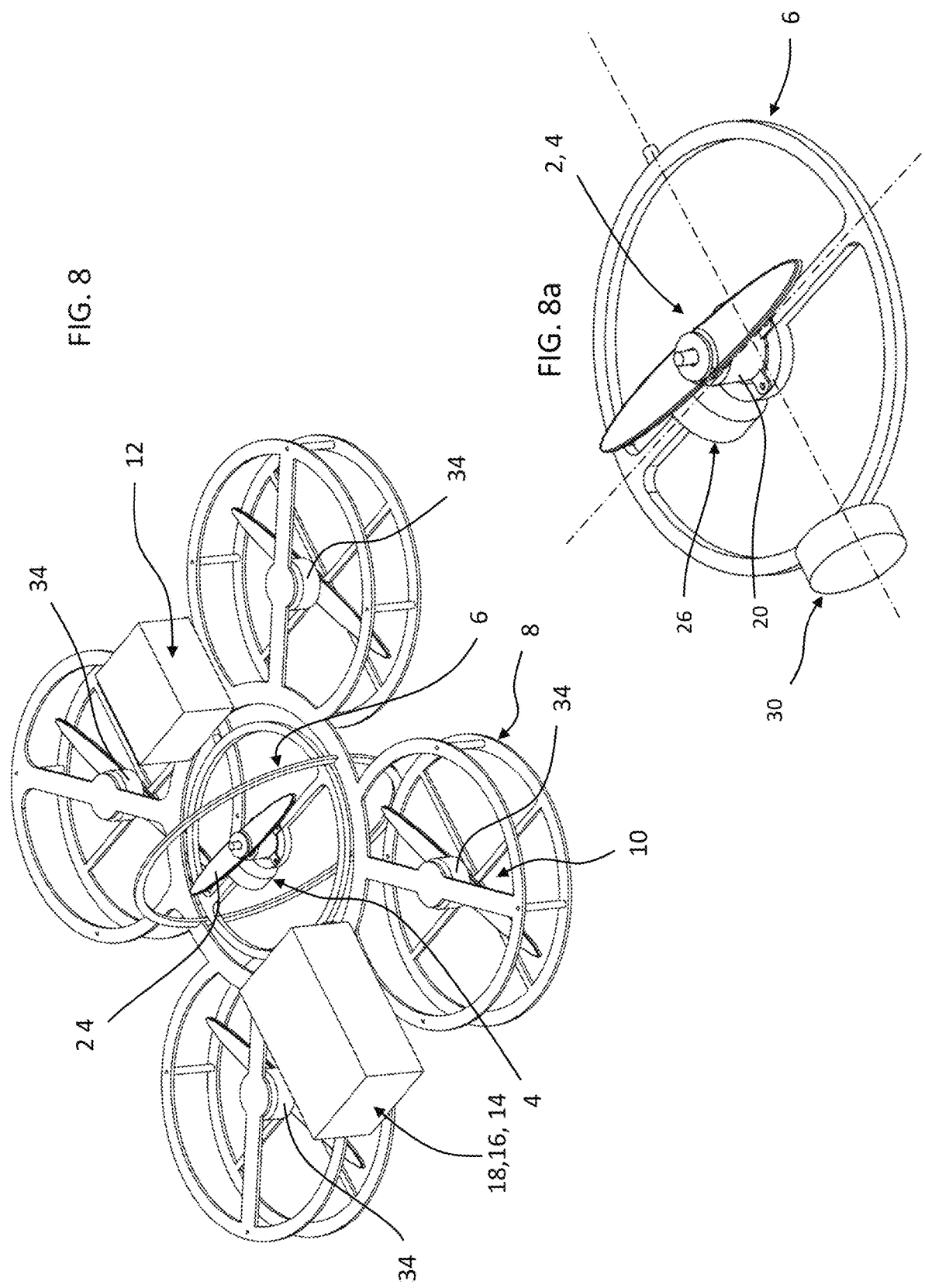

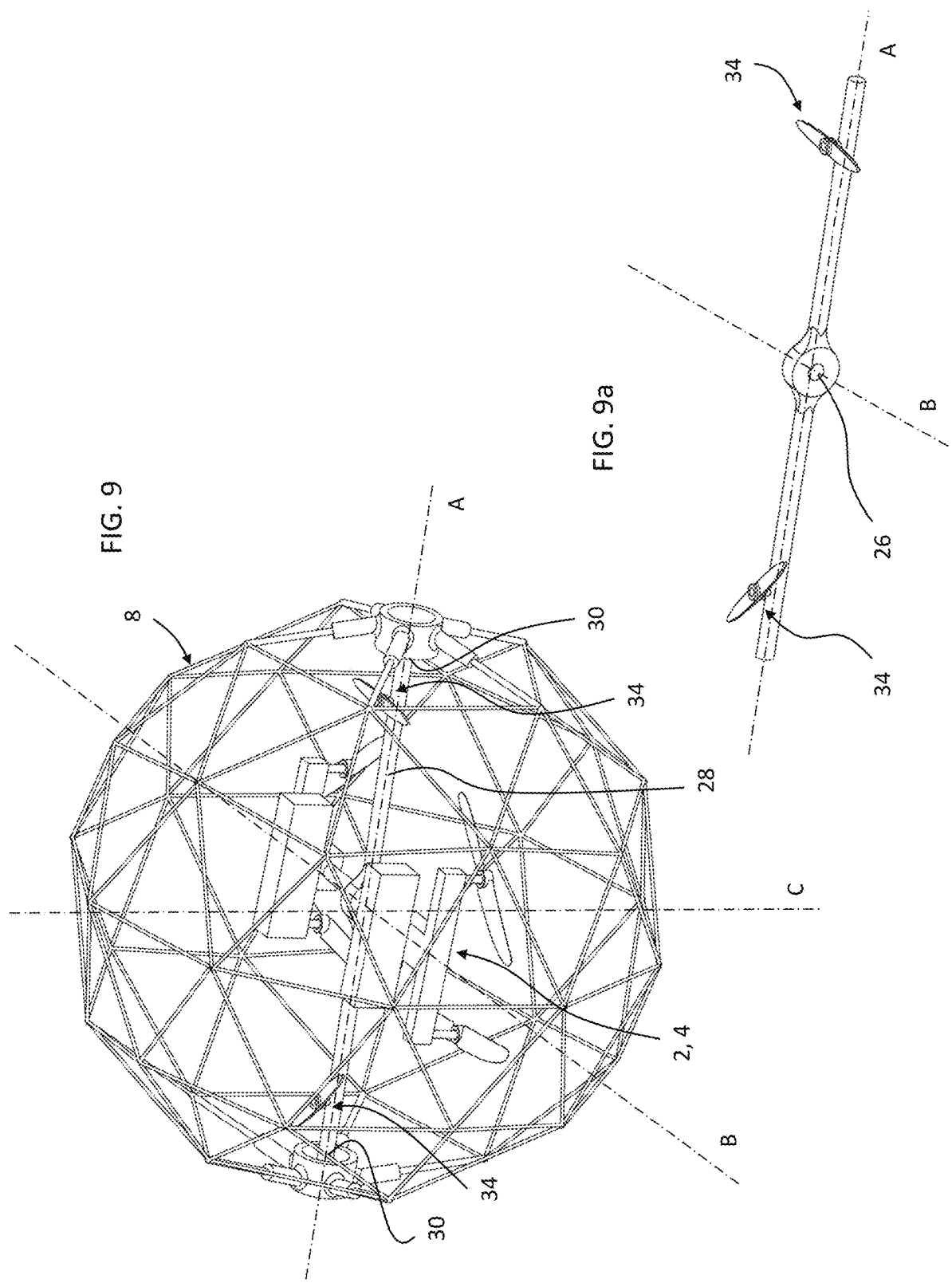

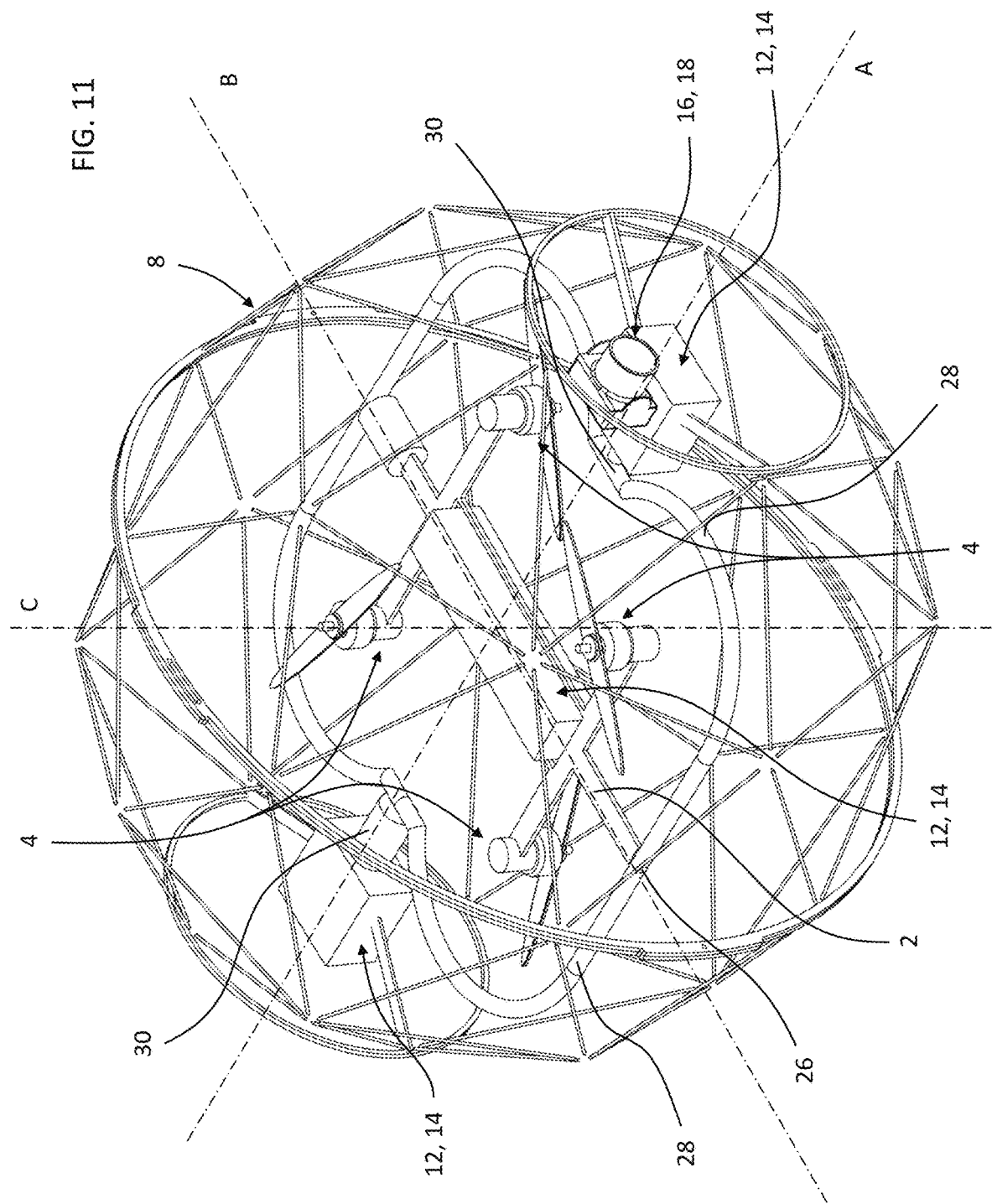

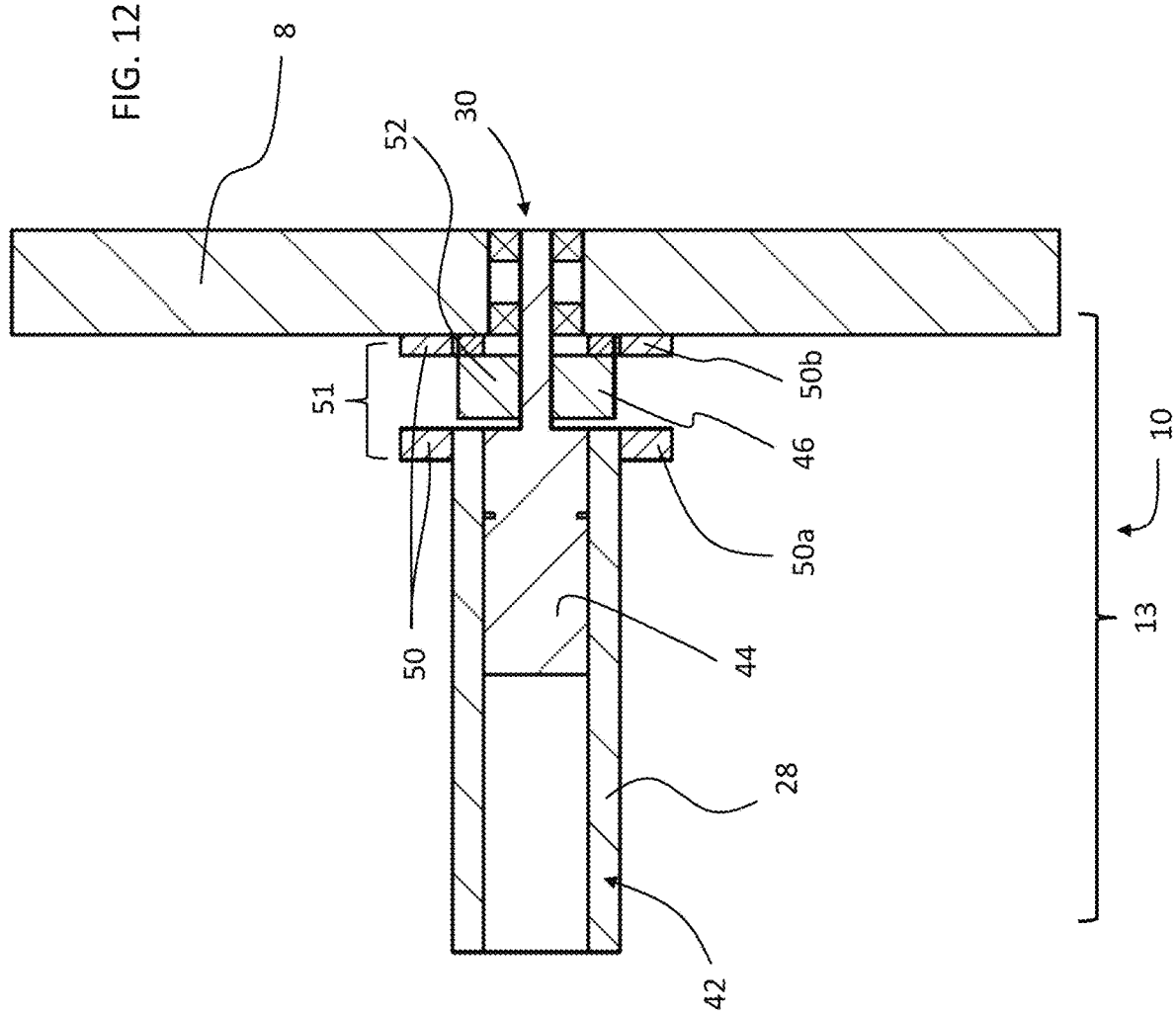

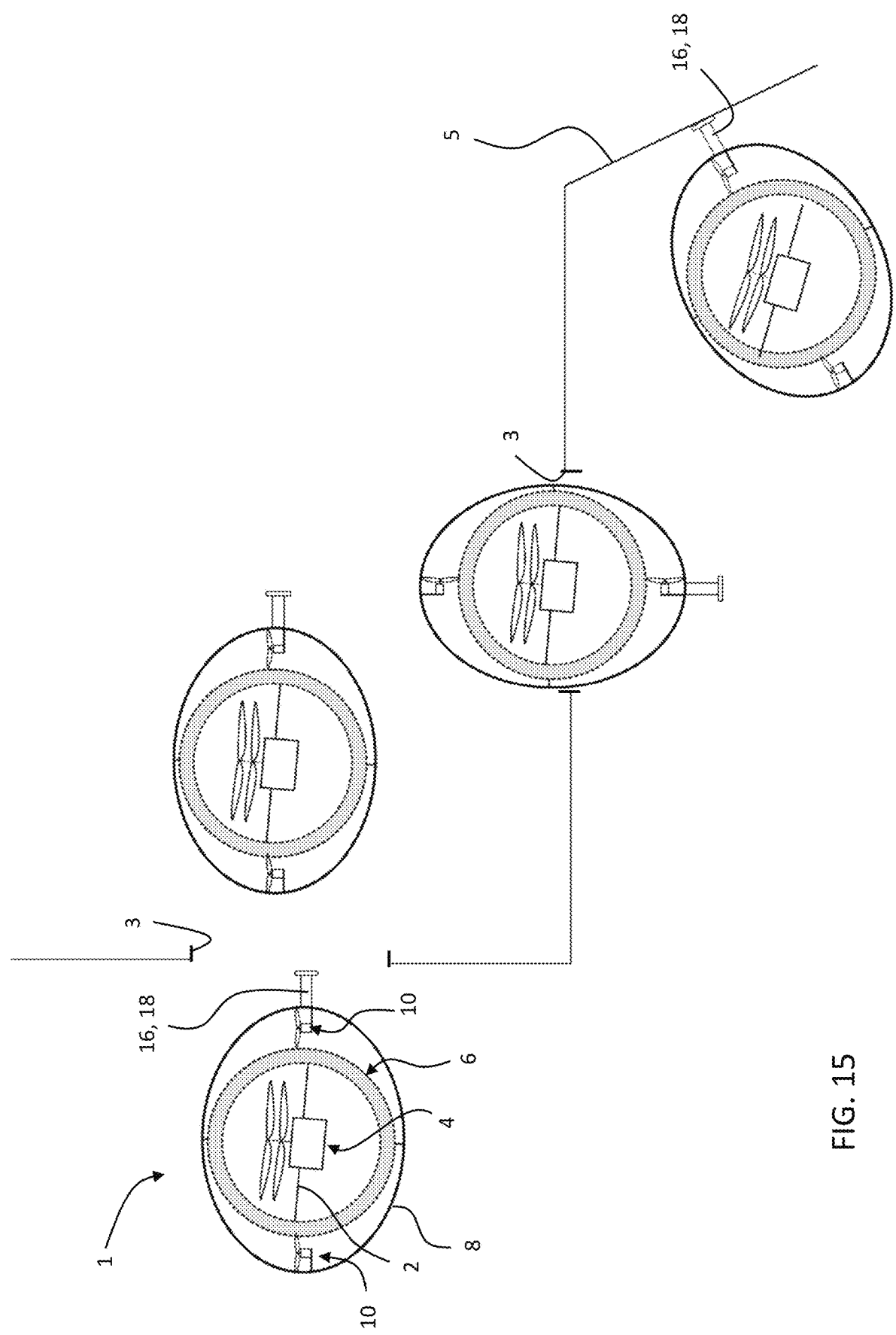

UNMANNED AERIAL VEHICLE WITH PROTECTIVE OUTER CAGE

This application claims priority to International PCT Application No. PCT/EP2018/073783, with an international filing date of Sep. 4, 2018, entitled "UNMANNED AERIAL VEHICLE AND PROTECTIVE OUTER CAGE," which claims priority to European Patent Application No.: 17189515.4 filed Sep. 5, 2017, the disclosures and figures of which are incorporated by reference as if set forth herein in their entirety.

The present invention relates to an unmanned aerial vehicle (hereinafter also referred to as "UAV") with a protective outer cage.

Protective outer cages structures for aerial vehicles are used to protect the inner frame of the aerial vehicle from collisions with the environment and the environment from the inner frame. The inner frame of an aerial vehicle typically includes a propulsion unit with rotating propellers, a control system to control and steer the aerial vehicle, a battery, possibly other components such as sensors, cameras, or goods to be delivered, some of these typically being sensitive to strong impacts, or requiring ease of access by an operator. The inner frame may be comprised of an inner support structure, such as a decoupling mechanism, or any other stiff mechanical apparatus which is not meant to come in contact with external obstacles.

Many aerial vehicles are provided with protective outer structures to avoid injury to persons and damage to the environment, as well as to protect the aerial vehicle from damage.

Examples of aerial vehicle with protective cages are illustrated in US D659771, WO 2015/135951, WO2004113166, WO2015022455, U.S. Pat. No. 9,150,069, US20100224723, U.S. Pat. No. 7,273,195, US20090075551, U.S. Pat. Nos. 8,147,289, 8,528,854, WO2015105554, and WO2014198774. Conventional protective cages are usually capable of protecting the inner frame of the aerial vehicle (in particular propellers) from touching objects during relatively low-energy contacts, sometimes only from some directions (e.g. on the sides).

In WO2014198774, the outer protective cage is coupled to the flight propulsion system via a gimbal system that allows free rotation of the outer cage relative to the flight propulsion system. A camera and sensors are mounted on the flight propulsion system within the outer cage. While this known design allows to produce a very light and resistant UAV that is particularly advantageous for inspection applications and other applications in confined spaces, the outer cage somewhat hinders viewing by the camera and sensors mounted on the propulsion unit within the outer cage. It is also difficult to install a robot manipulator or other tool that may for instance be useful for picking and placing objects or collecting samples or perching against a surface.

Another problem that may arise in UAV's with gimbal systems is gimbal lock that may occur.

An object of the invention is to provide an unmanned aerial vehicle (UAV) with a protective outer cage that provides a high resistance against collisions and that offers good protection to a flight propulsion system and other components mounted within the cage, yet has good maneuverability and provides good access for functional devices or sensors, for instance image capture system, lighting system, robot manipulator, and other functional or sensory devices installed in the UAV.

It is advantageous to provide a UAV that is compact yet has a high resistance against collisions and good flight performance, such as speed, maneuverability, stability and/or flight autonomy.

It is advantageous to provide a UAV with an outer cage that allows easy access to the inside of the protective cage, inter alia for replacement or repair of a battery, inner frame or propulsion system of the UAV.

For certain applications, it is advantageous to provide a UAV that can be used in confined spaces or in spaces with multiple obstacles, for instance for inspection purposes of buildings, pipelines, bridges, and other civil engineering structures.

In inspection applications, it is advantageous to provide a UAV that has a high degree of collision protection and yet that can fly at relatively high speeds when needed in order to increase operational efficiency in applications such as inspection applications in which the UAV is used.

Objects of the invention, according to a first aspect, have been achieved by providing an unmanned aerial vehicle (UAV) according to claim 1.

Objects of the invention, according to a second aspect, have been achieved by providing an unmanned aerial vehicle (UAV) according to claim 13.

Disclosed herein is an unmanned aerial vehicle (UAV) including an inner frame, an inner flight propulsion system mounted on the inner frame, an outer frame, a gimbal system comprising at least two rotational couplings coupling the inner propulsion system to the outer frame, a control system, a power source, and an outer frame actuation system configured to actively orient the outer frame around at least one axis with respect to the inner frame.

In a first aspect of the invention, the outer frame actuation system comprises an outer air propulsion system fixed to the outer frame or to a frame of the gimbal system. The inner flight propulsion system may be configured to enable the UAV to be suspended or flown without thrust from the outer propulsion system, and/or the outer propulsion system may be configured to enable the UAV to be suspended or flown without thrust from the inner flight propulsion system. In preferred embodiments, the inner flight propulsion system is configured to enable the UAV to be suspended or flown without thrust from the outer propulsion system.

In a second aspect of the invention, the outer frame actuation system comprises an electrical rotary actuator mounted on one or more rotational couplings coupling the outer frame to a gimbal frame of the gimbal system, and a clutch to allow decoupling of the outer frame from the gimbal frame.

In an embodiment, the outer air propulsion system comprises one or a plurality of propulsion units comprising propellers or turbines driven by motors controlled by the control system to govern the orientation of the outer frame with respect to the inner frame.

In an embodiment, the outer frame propulsion units may be positioned proximate but offset laterally from a gimbal axis coupled rotationally to the outer frame.

In an embodiment, at least one of the outer frame propulsion units is reversible and controllable to generate forward or reverse thrust.

In an embodiment, the outer frame propulsion units may be tilted so as generate thrust in a direction forming an acute angle with the vertical direction during stable flight, configured to control orientation of the outer frame around a Yaw axis.

In an embodiment, the outer air propulsion system may comprise propulsion units fixed to a frame of the gimbal system, the frame coupled to the outer frame via one of said rotational couplings.

In an embodiment, the outer air propulsion system may comprise at least two propulsion units, at least one propulsion unit mounted proximate each rotational coupling connecting the outer frame to the gimbal frame.

In an embodiment, the outer air propulsion system may be configured to generate lift in conjunction with the inner propulsion system for the flight of the UAV.

In an embodiment, at least one of said rotational couplings connecting the outer frame to a gimbal frame further comprises a clutch configured to block rotation of the outer frame with the gimbal frame and to allow decoupling of the outer frame from the gimbal frame.

In an embodiment, at least one of said rotational couplings further comprises an electrical rotary actuator to actively orient the inner frame relative to the outer frame.

In an embodiment, the inner propulsion system may have a single propulsion unit.

In an embodiment, the inner propulsion system may comprise a plurality of propulsion units.

In an embodiment, the clutch is electronically activated.

In an embodiment, at least one rotational coupling may comprise a torque sensor to sense a collision event.

In an embodiment, the clutch may be passive and configured to slip when a predefined amplitude of torque is exceeded.

In an embodiment, the outer frame may form an outer protective cage that surrounds and protects the inner flight propulsion system.

In an embodiment, the outer frame may form a generally non-spherical ovoid, oblong or elongated shape.

In an embodiment, the outer frame may comprise a support ring forming a port hole configured to provide access for components mounted at the port hole.

In an embodiment, the outer propulsion system may be mounted inside the outer protective cage formed by the outer frame.

In an embodiment, the outer propulsion system may be mounted in a removable manner, for instance by a mechanical connector or clamp mechanism to the outer protective cage, to enable easy dismounting and removal of the outer propulsion system.

In an embodiment, components of the UAV may be mounted at opposite ends of a long axis of the outer frame, said components including any one or more of a surveillance system, a functional system, sensors, lighting, elements of the control system, and elements of the power source.

In an embodiment, a surveillance system comprising any one or more of camera, a, distance sensor, a lighting system, is mounted to the outer frame.

In an embodiment, a functional system comprising any one or more of a robotic gripper or object manipulator, an electromagnet, a sensing probe, a fluid dispenser, a sample collector, is mounted to the outer frame.

In an embodiment, the gimbal system comprises a rotation joint, the inner frame comprising a beam coupled rotationally to the rotation joint forming a first of said forming said two rotational couplings, a second beam coupled rotationally to the rotation joint forming a second of said two rotational couplings, the second beam constituting part of the outer frame or part of the gimbal system.

In an embodiment, the rotation joint comprises first and second axes of rotation that are orthogonal and arranged in respective first and second offset parallel planes.

In an embodiment, the inner frame beam extends uninterrupted through the rotation joint and the second beam extends uninterrupted through the rotation joint.

In an embodiment, the power source comprises a battery, and the outer frame comprise a battery mounting frame with an adjustable battery mounting position on an opposite side of a rotation coupling from a functional system or payload to change the position of the battery along the battery mounting beam and thus adjust the center of mass of the outer frame.

Further objects and advantageous features of the invention will be apparent from the claims, from the detailed description, and annexed drawings, in which:

FIG. 4 is a schematic perspective view of a UAV with a protective outer cage according to another embodiment of the invention;

FIG. 4a is a schematic detailed cross section view of a rotational coupling of a gimbal of the embodiment of FIG. 4 and FIG. 4b is a perspective view of a joint of the rotational coupling of FIG. 4a;

FIG. 4c is a schematic cross section view of a battery and outer frame support beam and functional system of the embodiment of FIG. 4a;

FIG. 5 is a schematic perspective view of a UAV with a protective outer cage according to another embodiment of the invention;

FIG. 5a is a schematic detailed view of a rotational coupling of a gimbal of the embodiment of FIG. 5;

FIG. 6 is a schematic perspective view of a UAV with a protective outer cage according to another embodiment of the invention;

FIG. 6a is a schematic detailed perspective view of a joint of a rotational coupling of a gimbal of the embodiment of FIG. 6;

FIG. 7 is a schematic perspective view of a UAV with a protective outer cage according to another embodiment of the invention;

FIG. 7a is a schematic perspective view of certain components forming the embodiment to FIG. 7 separated apart;

FIG. 8 is a schematic perspective view of a UAV with a protective outer cage according to another embodiment of the invention;

FIG. 8a is a schematic detailed view of an inner propulsion system and inner frame of the embodiment of FIG. 8;

FIG. 9 is a schematic perspective view of a UAV with a protective outer cage according to another embodiment of the invention;

FIG. 9a is a schematic perspective view of a gimbal element of the embodiment of FIG. 9 with a propulsion system;

FIG. 11 is a schematic perspective view of a UAV with a protective outer cage according to another embodiment of the invention;

FIG. 12 is a schematic cross section view of a rotational coupling between an outer frame and a gimbal element of a UAV according to an embodiment of the invention;

Figure 14:
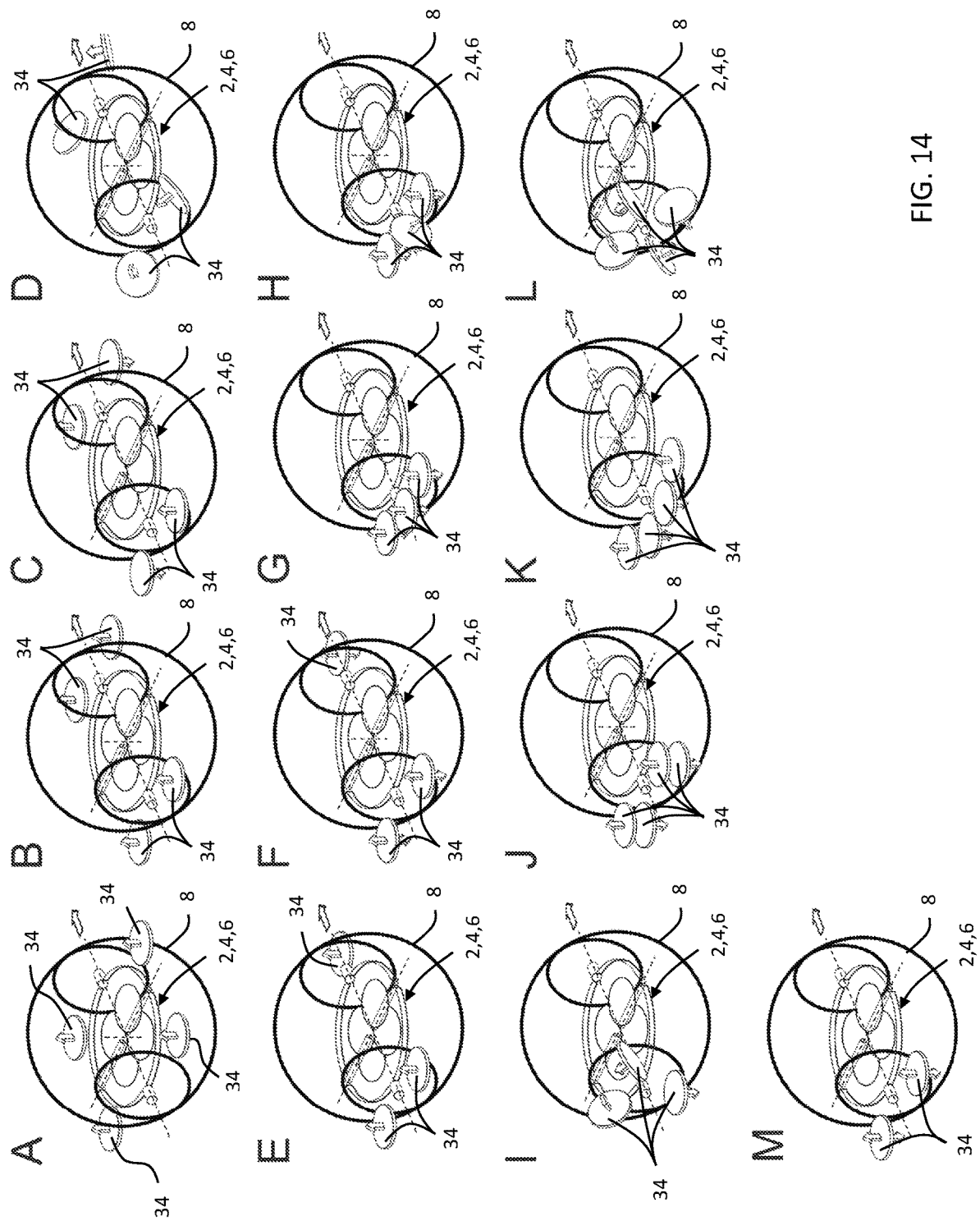

FIG. 14 schematically illustrates various outer frame propulsion unit configurations of a UAV with a protective outer cage according to embodiments of the invention;

FIG. 15 schematically illustrates orientations of an actuated outer frame relative to an inner frame to navigate the UAV or to orient the outer frame according to the shape of the environment, according to embodiments of the invention.

In FIGS. 2 to 7 and 11, connecting parts at the apex of beams forming the outer cage of the outer frame have been removed for better visibility, it being understood however that the beams are connected together at their ends.

Referring to the figures, an unmanned aerial vehicle (UAV) 1 comprises an inner frame 2, an inner propulsion system 4 mounted on the inner frame 2, an outer frame 8, and a gimbal system 6 coupling the inner propulsion system 4 to the outer frame 8. The gimbal system 6 comprises at least two rotational couplings, a first rotational coupling 26 coupling a gimbal frame 28 to the inner frame 2, and a second rotational coupling 30 coupling the gimbal frame 28 to the outer frame 8, or to a subsequent gimbal frame that is in turn rotationally coupled to the outer frame 8. In variants (not shown) the gimbal system may comprise additional gimbal frames rotationally coupled between the outer frame and inner frame.

The UAV 1 further comprises one or more control units 14 to control the flight of the UAV and various functions of the UAV and one or more power sources 12, in the form of one or more batteries. The control unit 14 may comprise microprocessors and various electronics circuit components to control motors, variable aerodynamic control elements of the propulsion system, actuators, sensors and functional devices and other components of the UAV. The control unit may further comprise wireless communication systems to receive commands transmitted remotely or transmit data to a remote unit wirelessly.

A surveillance system 16 comprising one or more cameras may be mounted to the UAV, preferably to the outer frame 8. The cameras may be used for inspection purposes, taking still and/or moving images that may be stored locally in a memory of the control unit or camera and optionally transmitted wirelessly to a remote unit.

The UAV 1 may further comprise sensors such as inertial sensors that may be used for directional control of the UAV but also for registering collision and also detecting excessive inertial shocks that may be a sign of damage to components of the UAV. Sensors may further include strain gauges or other force sensing elements positioned on the components of outer protective cage and optionally on elements of the inner frame or gimbal system of the UAV.

The flight propulsion system may comprise various other configurations and components per se known in the prior art, for instance according to the system described in WO 2014198774 incorporated herein by reference.

The inner propulsion system 4 may constitute a flight propulsion system for the UAV 1 in whole, or in part, depending on the embodiment, as will best be understood hereinafter. The inner propulsion system 4 comprises one or more propulsion units 20 comprising propellers 24 and motors 22 driving the propellers. Each propulsion unit 20 may have a single propeller or two or more coaxially mounted propellers. Propulsion units may also be in the form of turbines. The inner propulsion system may advantageously comprise four motors 22 with propellers 24 in an essentially rectangular formation as is per se known in the art. However, other variants of a propulsion system may be used, for example with one, two, three, five or more propulsion units 20 in various geometric dispositions. The propulsion units of the inner propulsion system can be tilted to increase the control authority around the yaw axis.

The propellers in multi-propulsion unit variants may advantageously be arranged in offset parallel planes, for example a first pair of propellers in a first plane and a second pair of propellers in a second plane such that the blades of the propellers may overlap. This allows the surface area covered by the propellers to be compact and optimized for the propulsion force as a function of the surface area covered. For instance in the embodiment illustrated in FIG. 3, a pair of propellers 24a that are diagonally arranged with respect to the other pair of propellers 24b are inverted with respect to the other pair such that one pair of propellers 24a are on one side of the inner frame 2 and the other pair of propellers 24b on the other opposite side of the inner frame 2.

The gimbal frame 28, or gimbal frames if they are a plurality of gimbal frames, may have various shapes, their function being to support and interconnect the inner frame 2 to the outer frame 8 in a lightweight and stable configuration. The rotational couplings 26, 30 comprise bearings, for instance roller bearings that minimize rotational friction, however other bearing arrangements may be utilized, for instance of the journal bearing type or even spring couplings that allow a certain degree of rotation of the gimbal frame with respect to the outer and inner frames. For instance the rotational coupling may comprise an elastomeric joint or a clock spring joint that allows a certain angle of relative rotation of the two coupled parts around the joint, for instance plus/minus 30 to 360 degrees.

The outer frame 8 forms an outer protective cage that protects the inner propulsion system 4 and various other components of the UAV mounted within the cage 8. The outer frame prevents the blades 24 of the propulsion system 4 from harming persons or from being damaged, and the outer frame further protects the components mounted in the UAV from being damaged upon impact with external objects. The outer frame 8 may comprise a plurality of interconnected beams 32 that form a lightweight cage structure that surrounds substantially completely the inner frame 2, inner propulsion system 4, and gimbal system 6 therein. The beams may be part of modules that are coupled together in various manners for essentially the same or similar principles as described in WO2014198774. However, according to embodiments of the invention other outer frame structures may be provided, for instance as illustrated in FIG. 8.

The UAV according to embodiments of the invention further comprises one or more control systems 14 and one or more power sources 12. The power source may in particular be in a form of one or more electrical batteries to supply electrical energy to electrical and electronic components of the UAV and to drive electrical motors of the propulsion system. Other forms of energy and motors may however be used without departing from the scope of the invention, for instance fuel as an energy source and thermally driven power systems.

The power source 12 may include a power source mounted on the inner frame 2 and/or the inner propulsion system 4, and/or a frame of the gimbal system 6, and/or on the outer frame 8. A power source mounted on the outer frame may be used to power the various components of the UAV that are fixed to the outer frame. In variants having a single power source, it may be mounted on the inner frame, a frame of the gimbal system, or on the outer frame.

For a power source comprising one or more batteries, the mounting position of the battery or batteries, and/or the shape and size of the battery or batteries, may be advantageously be selected or configured to counterbalance the weight of other components of the UAV to adjust the center of mass of the UAV as a whole, and/or to adjust the center of mass of the inner frame, and/or of the outer frame, and/or of the gimbal system.

In embodiments, for example as illustrated in FIG. 4c, the position of the battery 12a along a support frame element 27', for instance a support frame element fixed to the outer frame 8, can be variably adjustable in order to allow the position P of the battery 12a along the support frame element to be adjusted to change the position of the center of mass of the UAV. This is particularly useful if the beam 27 supports a functional system or payload on an opposing side of the rotation coupling joint 29 having a weight that can change according to the use of the UAV. The operator can thus adjust the position P of the battery along the support frame element 27' to counter the mass of the functional system 18 or payload at the other end of the beam 27. In a variant, the battery support frame element 27' may be configured to receive batteries of different shapes or sizes. The operator can thus adjust the center of mass by selecting the battery among a set of batteries with different masses or different shapes, in order to adjust the center of mass of the UAV. The adjustable position or interchangeable battery system discussed in relation to FIG. 4c may be implemented in other variants, for instance those illustrated in FIGS. 5-7. The shape of the battery 12a may advantageously be longer in the direction of the roll axis A and narrow in a direction orthogonal thereto such that it can be placed between the propellers of the inner propulsion system. The latter configuration allows the battery 12a to be as close as possible to the pitch axis B so that its weight can be compensated by the components 14, 16, 18 placed at the front end of the outer frame, further away from the pitch axis B, to take into account the high mass density of the battery.

Electrical interconnections for the transmission of power and/or control signals and/or data may be provided in the form of rotating electrical joints (e.g. slip rings) in the rotational couplings 26, 30 between the gimbal frame 28, inner frame 2 and outer frame 8.

Electrical interconnections may also comprise electrical cables mounted along the gimbal frame bridging across the rotational joints 26, 30 with a certain excess length to allow a certain degree of rotation of the joint. The flexibility of the electrical conductor and the excess length may allow the joint up to plus and minus 180 degrees of rotation or more. In variants comprising independent power sources provided on the inner frame and on the outer frame, electrical connections between the inner and outer frames may be avoided whereby control signals to and from the inner propulsion system 4 may be effected by a wireless communication system such as Wi-Fi, Bluetooth or ZigBee. Other wireless communication systems can be employed such as optical communication.

In variants, electrical connections between inner and outer frames can be used for electrical power transmission only, whereas the control signals to and from the inner propulsion system 4 may be transmitted by a wireless communication system.

Figure 2:
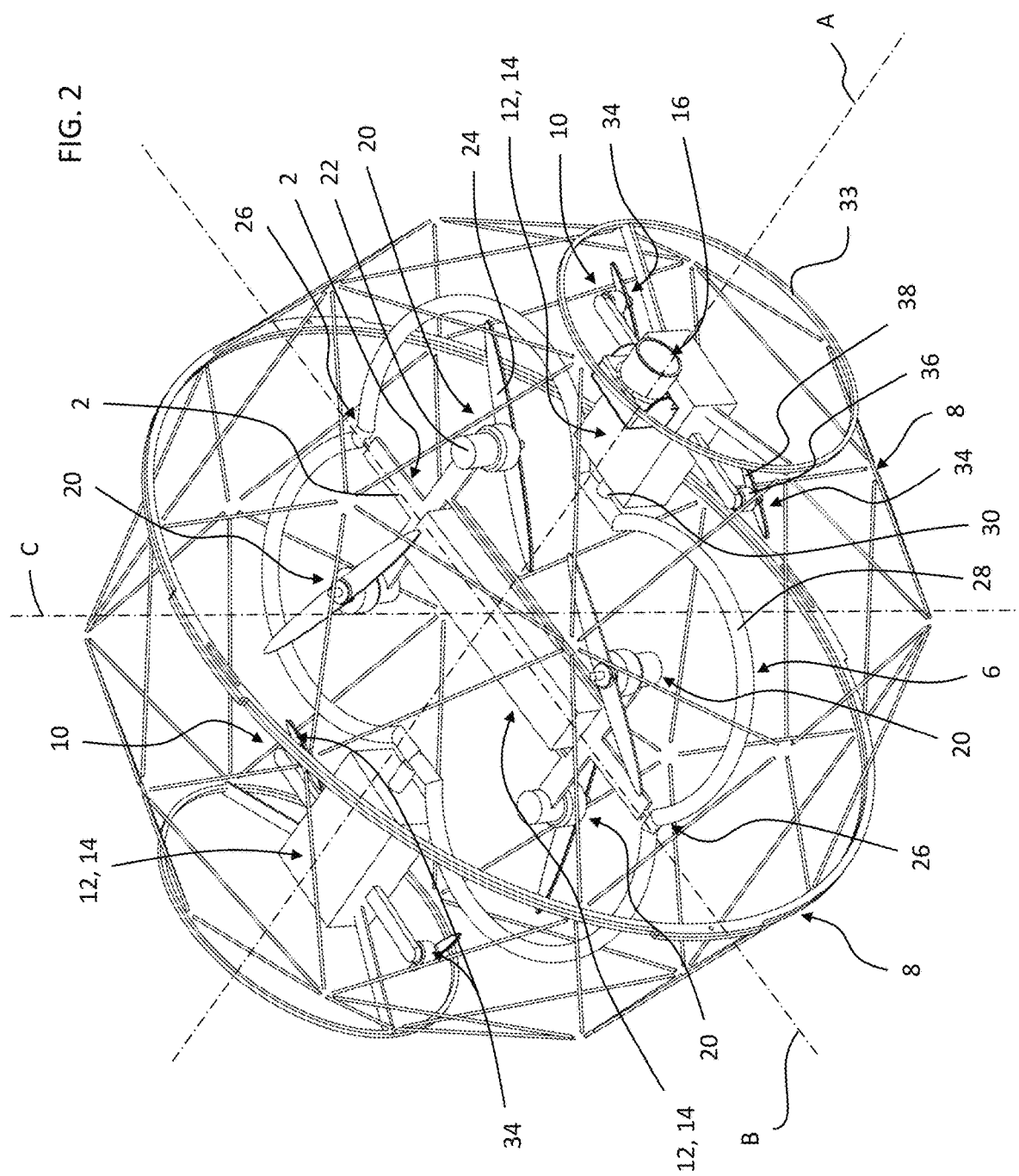
FIG. 2 is a schematic perspective view of a UAV with a protective outer cage according to another embodiment of the invention.
Figure 3:
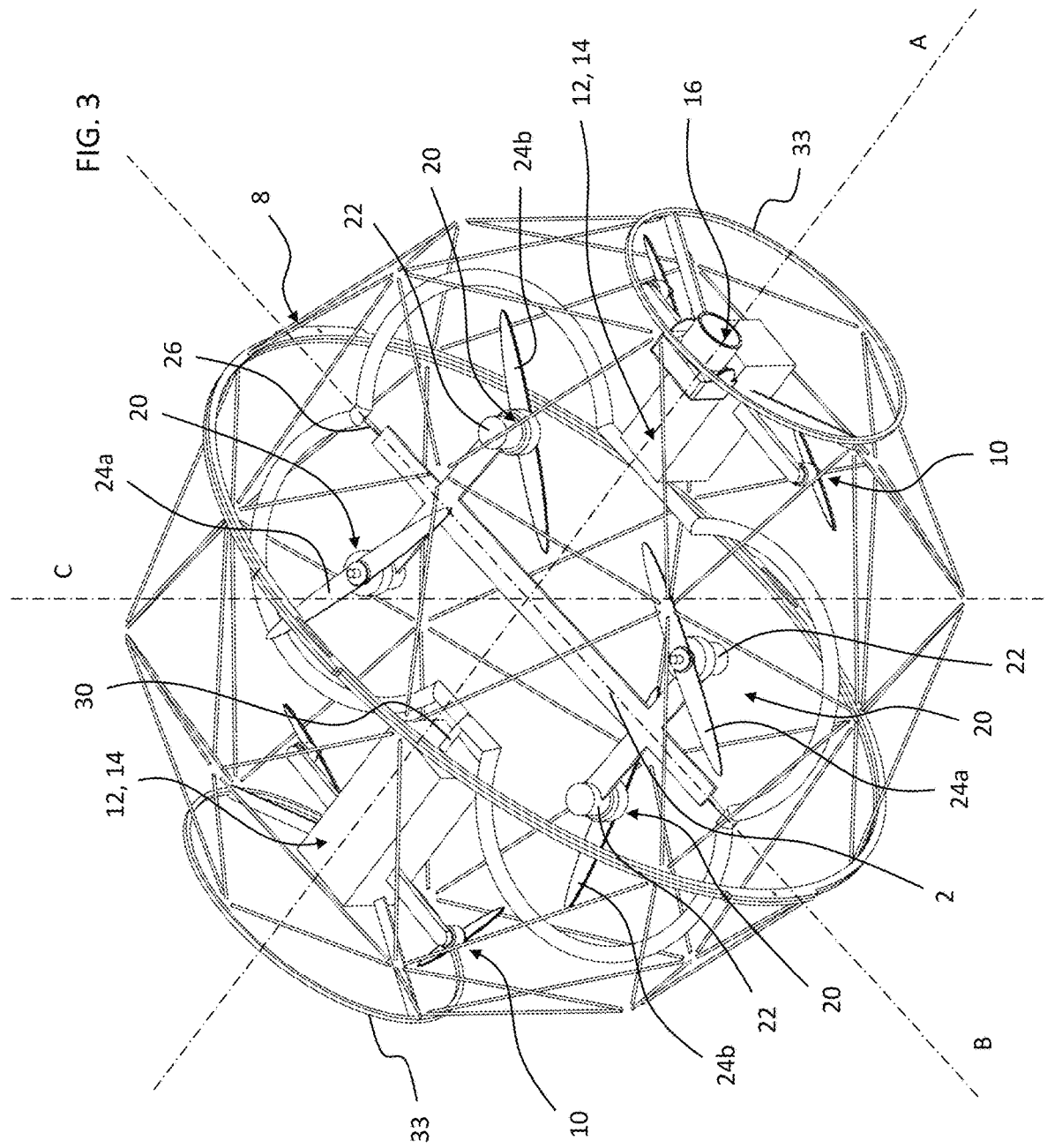
FIG. 3 is a schematic perspective view of a UAV with a protective outer cage according to another embodiment of the invention.

In embodiments as illustrated in FIGS. 2, 3 and 11, the gimbal frame 28 is shaped in a pattern that espouses the revolution of the spinning propellers 24 such that it forms a concave shape facing both longitudinal ends of the oblong outer frame 8 to provide more space for components (e.g. camera, lighting system, laser, clamp, probe, sensors, battery, control system) fixed at the longitudinal ends of the outer frame to the outer frame. This design is advantageous because the outer frame propulsion units and payload can be closer to the center of the UAV thanks to the shape of the gimbal frame 28, and the UAV can thus be compact in size. In the embodiments of FIGS. 2 and 11, the inner frame 2 integrates a battery of the power source 12 and control electronics of the control system 14. In the embodiment of FIG. 3 the battery 12 and control electronics of the control system 14 are integrated only in the outer frame 2, by way of example.

In preferred embodiments, the gimbal system 6 has only two axes to provide an optimal compromise between performance versus size, weight and complexity of the UAV.

The control system 14 comprises a control unit comprising a wireless communication system for communicating with an external controller for remote control of the UAV and/or for transmitting data such as data from an image capture device on the UAV or from other sensors measuring various parameters such as flight parameters (e.g. position, speed, orientation, altitude), environmental parameters (e.g. temperature, pressure, chemical identification), integrity of the UAV, and position with respect to external objects.

The control system may comprise a main control unit on the inner frame 2, or on the outer frame 8, and a slave unit on the outer frame respectively inner frame, or they may be two independent control units working together and communicating with the external remote controller.

The sensors may comprise inertial sensors, navigation and direction sensors, environmental sensors and various other sensors related to the application for which the UAV is intended.

The UAV may advantageously comprise a surveillance system 16 with an image capture device such as a video camera that may vision through an open longitudinal end 33 of the outer frame 8 such that the camera has an unobstructed viewing angle, yet is protected within the outer cage formed by the outer frame 8.

One or more functional systems 18 may also be mounted to the outer frame, for instance a robot arm for picking and placing objects, or for reading or taking samples, or for latching or perching the UAV on an external object. The functional element may include a prehensile arm to latch the UAV to an external object. The prehensile arm may for instance be used to pick up articles, take samples, or to latch the UAV onto an external object. The perching function allows the UAV to reduce power on the flight propulsion system, in order to increase autonomy, while allowing inspection to take place in a substantially static position.

In an advantageous embodiment, especially for applications in confined spaces, the outer cage may comprise a non-spherical shape, for instance resembling an ovoid shape as illustrated in FIGS. 2-7 whereby components of the UAV other than the inner propulsion system 4 may be mounted on opposite ends of the long axis A. Such components may in particular include a surveillance system 16, components of a functional system 18, sensors, and lighting. In view of the rotation around first and second axes A, B of the inner frame 2, inner propulsion system 4, and gimbal system 6, an essentially spherical volume within the cage is needed for free movement of the aforementioned elements. In the elongated cage shape, at the ends of the long axis A, the volume therein that extends beyond the spherical volume needed for rotation of the inner propulsion system 4, may be used to mount the surveillance system 16, functional system 18, and elements of a control system 14 and/or power source 12. It may be noted however that in other variants, the outer protective cage may have a generally spherical shape and various components could be fixed for instance in a form of satellites on the outside of the outer frame 8. For instance, in the embodiment schematically illustrated in FIG. 1, an outer propulsion system 11, power source 12, surveillance system 16 and control system 14 are mounted outside of the outer frame 8. The components mounted outside the outer frame 8 may be further surrounded by cage beam elements (not shown) that absorb shocks and protect the outer elements from damage during a collision with an external object. The cage beam elements can be mounted flexibly to the outer frame so they can deform upon collision.

In a preferred embodiment, the outer frame 8 comprises an elongate non-spherical shape such that the various components of the UAV may be mounted within the outer cage in a compact, high resistance and light weight configuration.

In an advantageous embodiment, the open longitudinal end of the outer frame comprises a support ring 33 forming a port hole defining a passage larger than the spaces between beams of the outer frame to provide good access for the camera viewing angle and for other sensors and lighting components mounted at the port hole. The support ring is illustrated in the illustrated embodiments as a circular ring, however the shape of the support ring may be optimized for the viewing position and angle of the surveillance system mounted in the outer frame, whereby the support ring is provided as small as necessary or useful for the viewing angle or access required for cameras and sensors. The support ring 33, which forms a closed circuit, also serves as a structural component to couple to beams 32 of the outer frame. The surveillance system 16 may comprise more than one camera, for instance cameras at different positions on the outer frame for example pointing in opposite directions such that the environment in front and behind the UAV may be simultaneously or alternatively viewed.

The UAV further comprises an outer frame actuation system 10 configured to actively orient the outer frame 8 with respect to the inner frame 2 and inner propulsion system 4, while providing a decoupling of the outer frame with respect to the inner frame and inner frame 2 and inner propulsion system 4 in case of collision with an external object or whenever free rotation of the outer frame relative to the inner frame is desired. The control system 14 may use orientation sensors on the inner frame, the outer frame, or both, or relative orientation sensors between the inner frame and outer frame (e.g. encoders in the rotation couplings).

The outer frame actuation system according to a first general embodiment of the invention comprises an outer air propulsion system 11 that acts upon the outer frame 8 configured to generate torque in at least one direction to rotate the outer frame around at least one axis. An advantage of this embodiment is that the outer air propulsion system does not affect the performance of the decoupling mechanism between outer and inner frames in case of contacts with external objects, because it does not affect the gimbal rotation joints nor rotation freedom of the gimbal mechanism. The outer propulsion system comprises one or more propulsion units 34. Each propulsion unit may have a single propeller or two or more coaxially mounted propellers. Propulsion units may also be in the form of turbines.

The outer frame actuation system according to a second general embodiment of the invention comprises an electrical rotary actuator 13 mounted on one or more rotational couplings 30 coupling the outer frame 8 to the gimbal system 6 in order to orient the outer frame 8 with respect to the inner propulsion system 4 around at least one axis, and a clutch 46 to allow decoupling of the rotational coupling.

Orientation of the outer frame about two or more axes of rotation may be controlled the outer frame actuation system alone, or by a combination of the outer frame actuation system and the inner flight propulsion system, depending on the embodiment, as will be described in more detail hereinbelow.

The outer frame actuation system 10, alone or in conjunction with the inner propulsion system depending on the variant, allows at least one axis of the outer frame 8 to be held in a stable orientation, or to move into a desired orientation, such that for instance a camera or sensor or functional system fixed to the outer frame may be oriented in a certain direction or kept in a stable orientation with respect to an external object. In preferred embodiments, the outer frame actuation system 10, alone or in conjunction with the inner propulsion system depending on the variant, allows two axes, or all three axes of the outer frame 8, to be held in stable orientations, or to move into a desired position, such that for instance a camera or sensor or functional system fixed to the outer frame may be oriented in a certain direction or kept in a stable position with respect to an external object. This allows for instance an image capture device such as a camera to point in a certain direction or a certain angle of orientation and to capture the image unhindered by elements or beams of the outer frame (compared to an image capture device fixed to the inner frame) while the UAV is moving. In the event of collision with an external object such as wall, ceiling, floor or other object, a rotation of the outer frame 8 with respect to the inner propulsion system 4 via the gimbal system 6 may occur and can be corrected by the actuation of the outer frame actuation system 10 alone or in conjunction with the inner propulsion system depending on the variant, back to the desired orientation of the outer frame 8. The outer frame actuation system 10 may also be used to avoid or to get out of a situation of gimbal lock.

FIG. 15 illustrates schematically orientations of an actuated outer frame 8 relative to the inner frame 2 allowing the outer frame to be stable while the inner frame inclines to navigate or to orient a non-spherical outer frame according to the shape of the environment for instance to go through a hole 3, or to face an object 5, for instance to place a functional system 18 fixed to the outer frame 8 in contact with the object 5.

A non-actuated decoupled outer frame cannot be used for many applications where components may need to be close to or on the outer frame, because a non-actuated outer frame may be in various uncontrollable orientations while the components on it may need to be oriented in a desired orientation. Placing components on the gimbal system or outer frame enables new applications for components working in contact with objects or reduces some limitations present when some components are placed on the inner frame. Actuating the outer frame even allows stabilizing the orientation of these components at a stable orientation, which is usually not possible on the inner frame, which may constantly change orientation due to the control system.

Typical components that may benefit from being located on the outer frame or gimbal system include:

A camera or thermal camera whose picture may be obstructed by the outer frame if placed on the inner frame, while it would provide an obstruction-free view if placed on the outer frame. If the outer frame has a stable orientation, the camera will generate more stable videos or less-blurry pictures.

Lighting system which is obstructed by the outer frame when placed on the inner frame. This creates shadows and reflections on the camera. Placing them on the outer frame solves the problem.

Exteroceptive sensors used for control (such as cameras, distance sensors, etc.) may be obstructed by the outer frame if placed on the inner frame. They would provide data unaffected by obstructions if placed on the outer frame.

Sensors working in contact with objects, such as UT thickness sensors (Ultrasonic Testing)

Manipulators (such as a robotic arm, an electromagnet, etc) which need to be oriented at various angles and grasp objects or perch on the environment The control of the orientation of the outer frame relative to the inner frame is also advantageous for other reasons such as:

To orient the outer frame to ensure at least two axes of rotation of the gimbal mechanism stay horizontal and perpendicular in most cases, as these are needed to decouple the roll and pitch axes of the inner frame from disturbances due to collisions, which are the disturbances that generate a loss of lift and change in orientation of the thrust vector once the inner frame rotates.

To orient the outer frame away from gimbal lock in case the gimbal system is comprised of three axes of rotation or more.

To stabilize the outer frame to reduce dynamics effect on the overall drone stability To orient a non-spherical outer frame to allow flying through narrow passages (such as manholes).

To control the outer frame in arbitrary orientations and trajectories. The outer frame can be controlled such that it has its 6 degrees of freedom fully controllable. This can be useful for artistic demonstrations, light shows, showing LED displays, etc.

In the first general embodiment of the invention, the outer air propulsion system 11 comprises one or more propulsion units 34 comprising propellers 38 or turbines driven by motors 36 that may be controlled by the control system 14 to govern the orientation of the outer frame 8 with respect to the inner frame 2 and inner propulsion system 4.

It may be noted that in certain variants the inner propulsion system 4 may also be used in conjunction with the outer air propulsion system 11 to control orientation of the outer frame 8.

For instance, in the variants illustrated in FIGS. 2 to 7, 9 and 10, the inner propulsion system can be used to generate torque on the outer frame 8 about the yaw axis C since the inner frame 2 is coupled in a torque relationship about the yaw axis C to the outer frame, but is decoupled from the outer frame 8 around the roll axis A and pitch axis B, due to the configuration of the two axis gimbal system 6 in these variants. For a gimbal system with three or more axes, the inner frame is decoupled from the outer frame about all three axes, namely the yaw axis C, roll axis A and pitch axis B. In the latter variants, the control of orientation of the outer frame can also be performed by the outer frame actuation system in conjunction with the inner propulsion system provided that one of more of the rotational couplings of gimbal axes can be blocked using a passive or active clutch as described hereinbelow.

In the variants of FIGS. 2 to 7, the orientation of the outer frame may also be solely controlled by the outer air propulsion system. In the illustrated variants, the outer air propulsion system comprises a plurality of propulsion units 34, preferably at least 3, more preferably four or more, that are positioned spaced apart and offset from the rotation axes A, B, C such by controlling the thrust generated by each of the propulsion units, torque may be applied on the outer frame around each of the axes A, B, C. To improve control of the rotation about the yaw axis C, preferably at least two of the propulsion units may be mounted at a tilt angle with respect to the yaw axis C.

Figure 10:
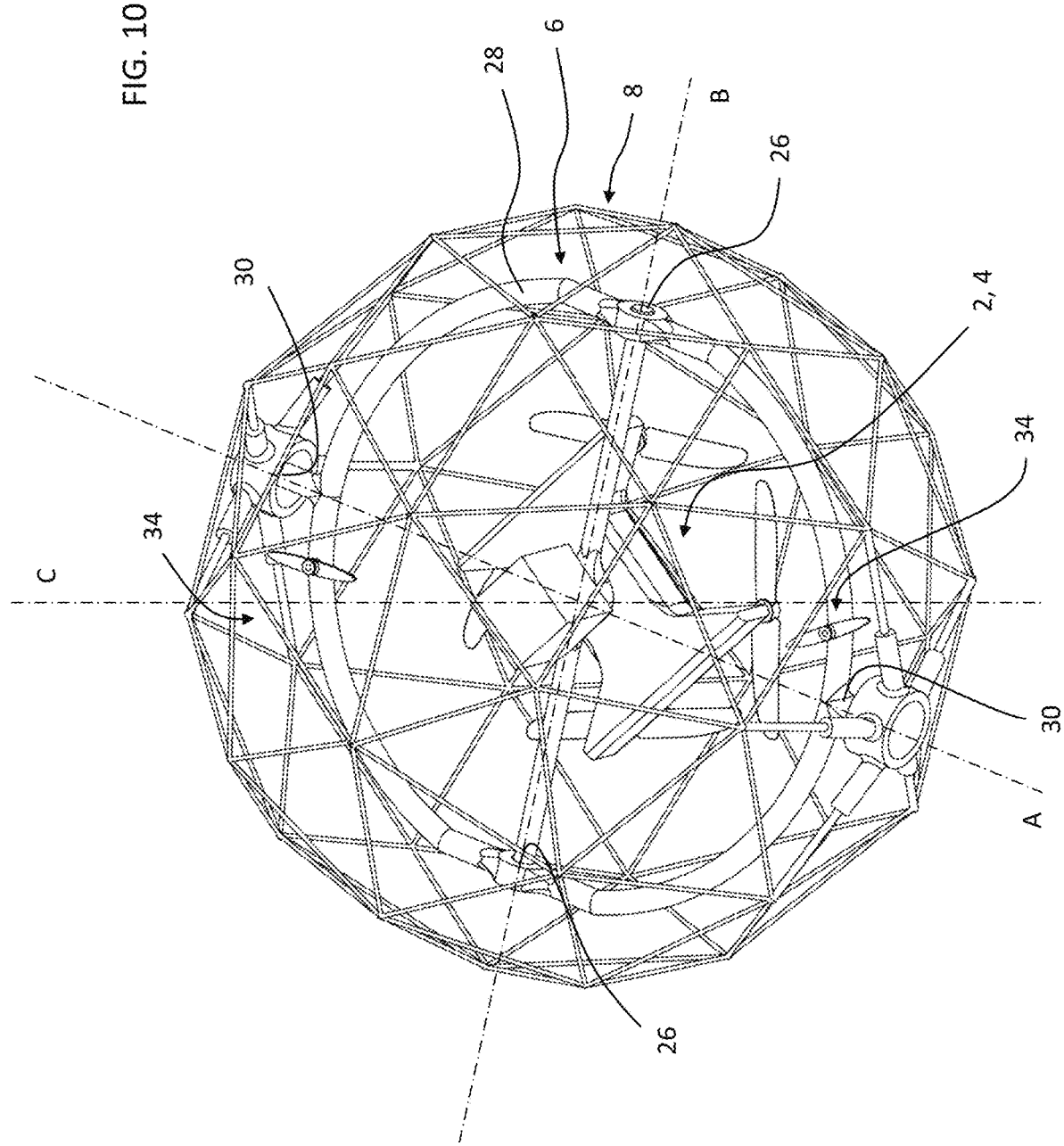
FIG. 10 is a schematic perspective view of a UAV with a protective outer cage according to another embodiment of the invention.

In the variants of FIGS. 9 and 10, the outer air propulsion system comprises propulsion units 34 mounted on a frame 28 of the gimbal system rotationally coupled to the inner frame 2 via a first rotational coupling 26 and to the outer frame 8 via a rotational coupling 30. In the illustrated embodiments, the outer air propulsion system comprises at least two propulsion units, at least one proximate each rotational coupling 30 connecting the outer frame 8 to the gimbal frame 28. The orientation of the outer frame 8 about at least one gimbal axis B (the pitch axis B in this example) is performed by the propulsion units 34. The orientation of the outer frame 8 about the yaw axis C, may be performed by the inner propulsion system 4, since the inner frame 2 is coupled in torque to the gimbal beam 28 and outer frame 8 about the yaw axis C.

In the embodiments illustrated in FIGS. 9 and 10, orientation of the outer frame 8 about the gimbal axis A (the roll axis A in this example) may have various configurations. In a first configuration, the outer frame 8 may rotate about the axis A without any active orientation, either freely rotating about the rotational coupling 30, or restricted from rotation unless there is collision or interference with an external object, whereby the rotational coupling 30 may comprise a limited torque coupling, or an active clutch coupling as described in relation to other embodiments herein. In a second configuration, orientation of the outer frame 8 about the axis A may be performed by an electrical rotary actuator mounted to the rotational coupling 30 to actuate the rotation of the gimbal frame 28 relative to the outer frame 8 about the gimbal axis A. The actuator and rotational coupling may comprise various features of the system described hereinbelow in relation to the embodiments of FIGS. 12 and 13.

The use herein of the terms yaw axis, pitch axis, and roll axis generally refer to the axes of the main flight propulsion unit of the UAV that counters the weight of the UAV, whereby a change of orientation of the thrust and weight about the yaw, pitch and roll axes changes the direction of flight of the UAV. In flight with a static position, without external disturbances, the yaw axis is vertical, however the roll and pitch axes may be interchangeable in the sense that the UAV does not necessarily have a preferred or designated orientation relative to the direction of flight. The use of the terms yaw axis, pitch axis, and roll axis in relation to the illustrated embodiments are however not intended to be limiting when referring to a rotational axis of the gimbal system, since for instance the flight propulsion thrust may be a combination of inner and outer propulsion systems such that the orientation of the yaw, roll and pitch axes may not correspond to actual flight axes but rather relative orientation axes of the inner and outer frames. The terms yaw axis, pitch axis, or roll axis may thus also be used herein to designate different axes of rotation of the gimbal system and UAV without limitation regarding the orientation with regard to an external reference.

The outer propulsion system 11 may not only be configured to orient the outer frame 8 with respect to the inner frame but may also be used to participate in providing lift in conjunction with the inner propulsion system 4 for the flight of the UAV 1. In its most common orientation, the UAV will benefit from the outer frame propellers generating forces upward in order to produce more lift which reduces propulsion disk loading, increases flight efficiency and maximizes thrust available for fast maneuvers.

Figure 8B:
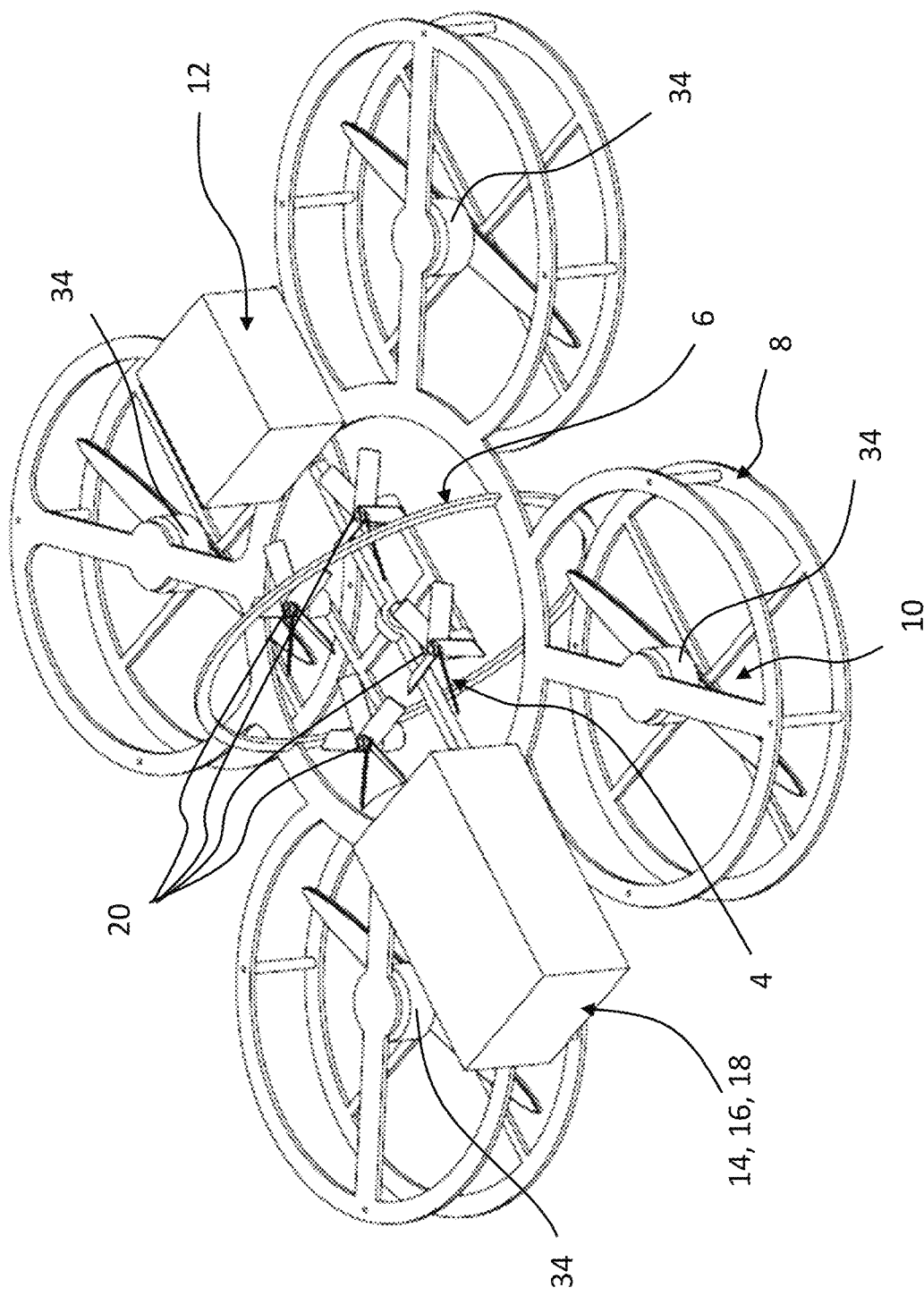
FIG. 8b is a schematic perspective view of a variant of the embodiment of FIG. 8.

The distribution of power between the inner propulsion system 4 and outer propulsion system 11 may be configured differently according to various embodiments. For instance in the embodiments of FIGS. 1-9 and 10-11 the outer propulsion system 11 generally provides less lift than the inner propulsion system 4 that provides the main lift for flight of the UAV. However in the embodiments as illustrated in FIGS. 8, 8a, 8b the outer propulsion system 11 provides the principal lift for flight of the UAV, thus providing more lift than the inner propulsion system 4. In this embodiment the outer propulsion system is configured to enable the UAV to be suspended or flown without thrust from the inner flight propulsion system. Nevertheless, in the embodiments illustrated in FIGS. 8, 8b, the inner propulsion system may be configured to be sufficiently powerful in order to provide enough lift to suspend the UAV 1 in air in case of failure of the outer propulsion system 11. More importantly, during collisions the outer frame general lift will no longer be vertical and the inner frame propulsion system is configured to provide the general lift while the outer frame is not stabilized. The outer propulsion system may comprise one, two, three, four or more propulsion units 34 at various positions fixed to the outer frame 8. By way of example, the inner propulsion system illustrated in FIG. 8c comprises four propulsion units 20 whereas the inner propulsion system illustrated in FIGS. 8, 8a comprises a single propulsion unit 20.

For embodiments in which the inner propulsion system, for instance as illustrated in FIGS. 8, 8a comprise a single propulsion unit 20, an advantage is that they provide more thrust for the surface area covered by the propeller blades compared to a multi propulsion unit arrangement and thus can be more compact than variants with a plurality of inner propulsion units.

Figure 13A:
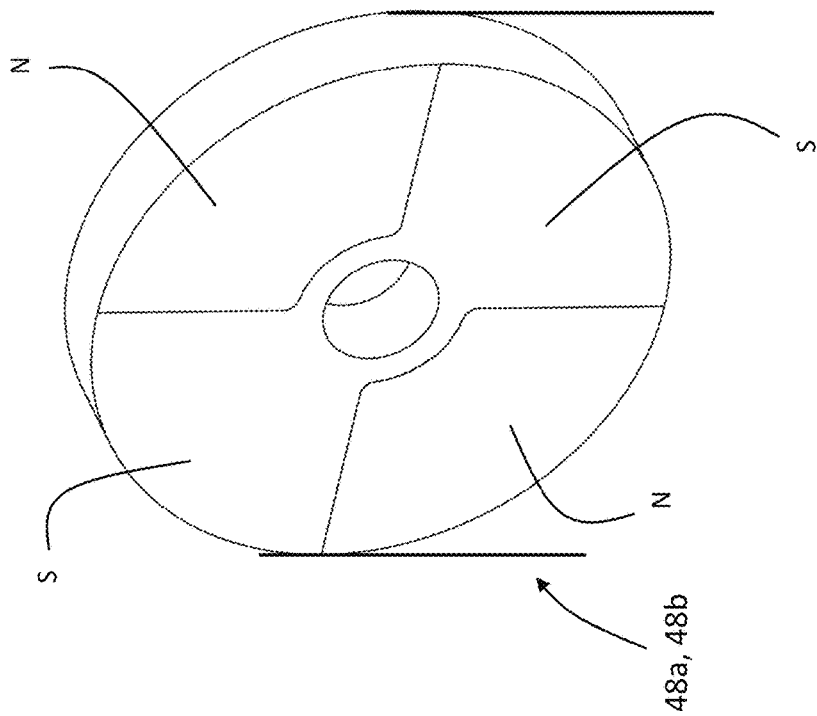
FIG. 13a is a schematic perspective view of an embodiment of a magnet of the rotational coupling of FIG. 13.
Figure 13:
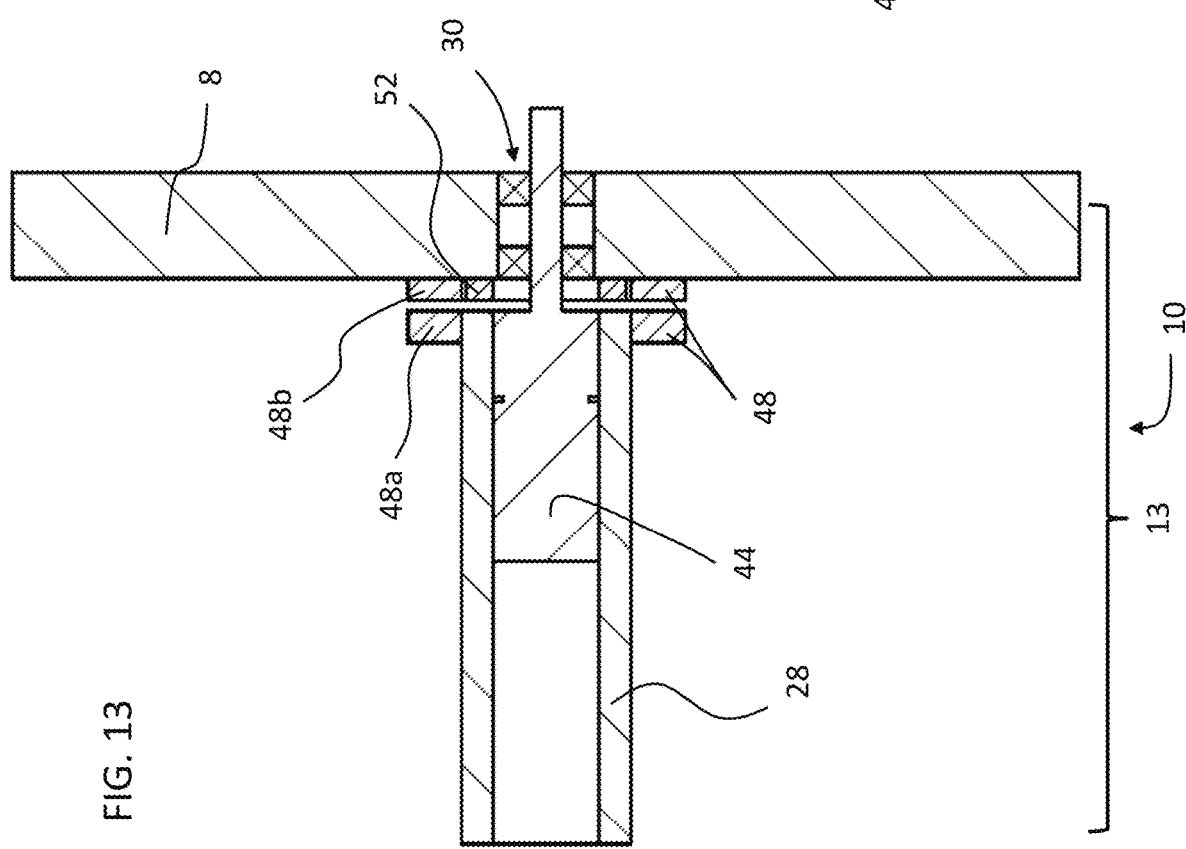
FIG. 13 is a schematic perspective view of a rotational coupling between an outer frame and a gimbal element according to another embodiment of the invention.

The orientation of the inner propulsion system may be controlled by providing electrically actuated rotational couplings 26, 30, for instance comprising electrical motors as below in relation to the embodiments illustrated in FIGS. 12 and 13. This is especially useful for embodiments with a single inner propulsion unit.

An orientation sensor (not shown) coupled to the inner frame 2, for instance a multi-axis gyroscopic sensor, may be provided to sense the orientation of the inner frame and transmit input to the control system driving the actuated rotation couplings in order to control the orientation of the inner propulsion system according to the desired flight trajectory. This is especially useful for embodiments with a single inner propulsion unit or where the outer propulsion system provides the principle thrust for lift and flight of the UAV.

It may be noted that an inner propulsion system with a single propulsion unit and electrically actuated rotational couplings of the gimbal system may also be implemented in other variants where the outer frame has a cage configuration and where the inner propulsion system provides most of the lift, for instance replacing the inner propulsion system of the embodiments of FIGS. 1, 2, 9, 10, and 11.

Various configurations of possible outer propulsion systems are illustrated schematically in FIGS. 14a to 14j, and briefly summarized below:
  a. Four propulsion units generate upward lift which can stabilize and orient a two or three axis gimbal system.
  b. To only increase size along the forward speed direction, the propulsion units are placed in rectangle pattern,
  c. Two of these propulsion systems can be constantly reversed. This allows generating torque on the outer frame with minimum horizontal side forces.
  d. Inclining the propulsion units horizontally improves the controllability along the vertical axis.
  e. For two axis gimbal system, three propulsion units may be used to control the two axes.
  f. For a three axis gimbal system, three propulsion systems are sufficient if they can reverse their spinning direction and thus their force.
  g. To ease the integration, the three propulsion units can be placed on the same side.
  h. Inclining one propulsion unit gives a better controllability along the vertical axis.
  i. The three propulsion units can be tilted in different configurations.
  j. To control a three axis gimbal system, four propulsion units are needed if they can't reverse their spinning direction and thus their force. To ease integration they can be put on the same side of the outer frame and can be put on different levels.
  k. The propulsion units can also be put on the same level.
  l. The propulsion units can be tilted to increase the controllability around the vertical axis (the yaw axis).

Figure 1:
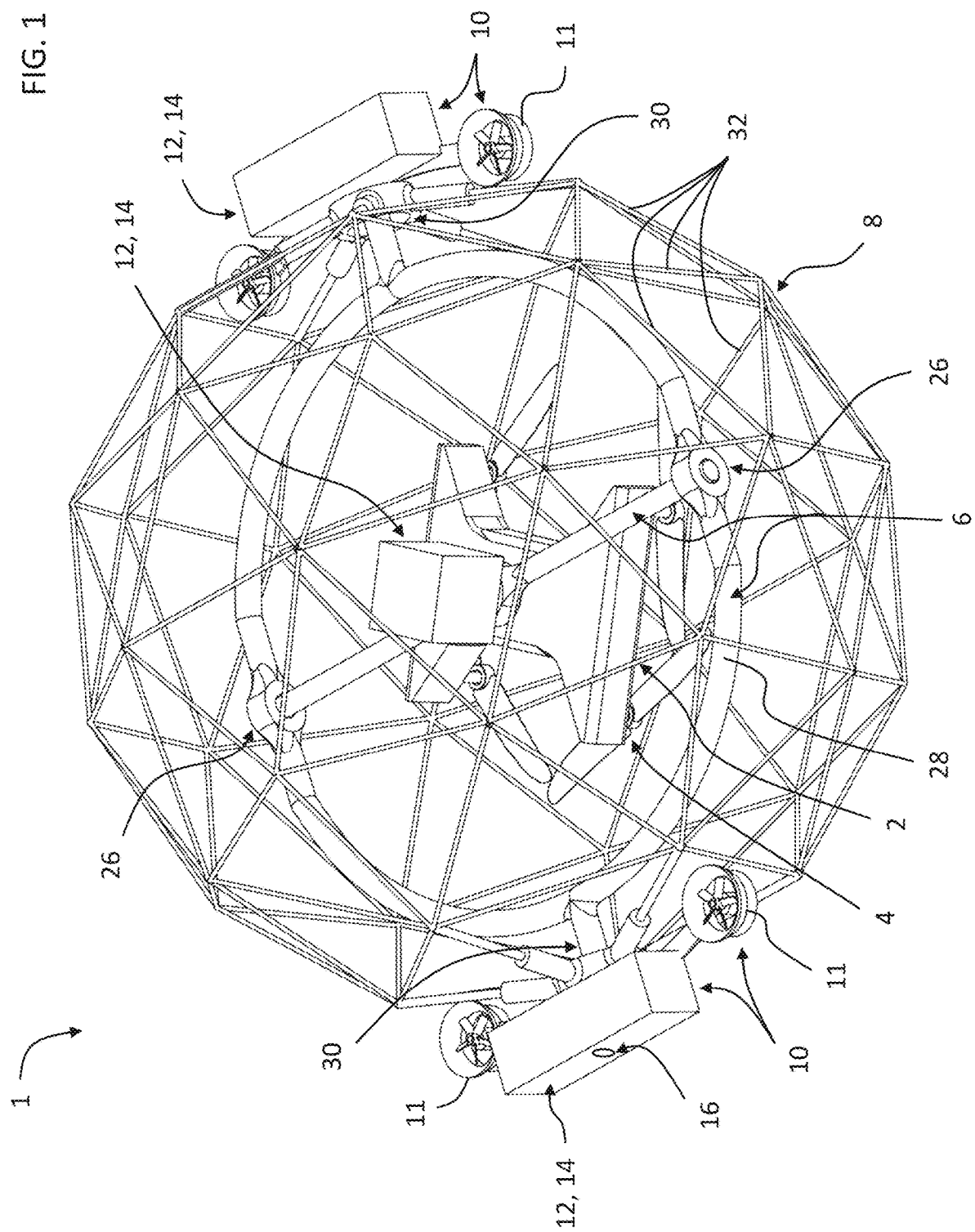
FIG. 1 is a schematic perspective view of a UAV with a protective outer cage according to an embodiment of the invention.

In an advantageous embodiment, the propellers 38 of the outer propulsion system may be mounted within the outer frame 8 such that they are protected by the outer frame from collision with external objects. In a variant, the propulsion units may be mounted only outside of the outer frame for instance as shown in FIG. 1, whereby a protective shroud may be mounted around the propeller or turbine blades.

In an advantageous embodiment, the outer propulsion system may be mounted in a removable manner, for instance by a mechanical connector or clamp mechanism to the outer protective cage, to enable easy dismounting and removal of the outer propulsion system for uses where the outer propulsion system is not needed, or for easy replacement of the outer propulsion system. The removal of the outer propulsion system may be advantageous in certain circumstances when not required to reduce weight and power consumption, thus also increasing flight autonomy.

In advantageous embodiments, the outer propulsion system may comprise propulsion units that are positioned close to but offset laterally from a gimbal axis A coupled rotationally to the outer frame 8, as shown in FIGS. 2-7.

In a variant, the propulsion units 34 of the outer propulsion system 11 may be mounted on a gimbal frame 28 coupled to the outer frame 8 for instance as illustrated in the embodiments of FIGS. 9 and 10.

The outer propulsion system may advantageously comprise propulsion units 11 that are reversible, to provide rapid and versatile orientation of the outer frame 8 around the pitch axis B and roll axis A. The ability for the propulsion units 11 to be able to reverse their thrust, aids in maximizing upwards forces in stable orientation, as well as maximize torque and minimize sideways forces during recovery maneuvers (when some propulsion units are reversed).

In order for some or all propulsion units 11 to generate lift when the outer frame 8 is in a stable orientation and the center of mass of the outer frame 8 is aligned with the rotation axes A, B, one or more propulsion units 11 may advantageously be placed on each side of the horizontal rotation axes A, B.

In order to minimize the power used by the outer frame propulsion units 11 and minimize torque disturbing the outer frame 8 during the UAV's motion, it is advantageous to have the center of mass of the outer frame 8 substantially aligned with both rotation axes A, B (or be below or above both rotation axes) in the stable orientation of the outer frame. If the outer frame may be used in several stable orientations, it is advantageous to have the center of mass of the outer frame substantially aligned with both rotation axes.

For a three-axis gimbal system at least three reversible propulsion units 11 are needed. However, with only three propulsion units, they may have to often switch direction to stabilize a balanced outer frame 8, making a smooth stabilization difficult. It is advantageous to use a fourth propulsion unit to solve the problem without adding too much complexity. The four propulsion units can be mounted at different levels and at different angles to improve ease of integration in a compact arrangement and enhance ease of flight control.

To ease integration in a compact arrangement and only increase the UAV size along one direction, in certain embodiments it may be advantageous to place the outer frame propulsion units close to each other along the last decoupling axis A of the gimbal system 6 coupled to the outer frame 8. This works especially well as there is less inertia around this axis and thus requires less torque/spacing between the propulsion units.

To simplify integration in a compact arrangement and better balance the weight of the UAV, in certain embodiments it may be advantageous to place all outer frame propulsion units on the same side of the outer frame, which could for example balance an outer frame's payload around a horizontal axis of rotation.

In certain embodiments it may be advantageous to place the outer frame propulsion units on different levels to simplify the integration in a compact arrangement.

In certain embodiments it may be advantageous to orient the outer frame propulsion units with horizontally tilted angles so as to form an acute angle with the vertical direction, to enhance ease of flight control, in particular about the Yaw axis during flight.

For a two axis gimbal system 6, only two outer frame propulsion units can be used on a balanced outer frame 8 if they are reversible. However, with only two propulsion units, they may have to often switch direction to stabilize a balanced outer frame 8, making a smooth stabilization difficult. A third propulsion unit allows having at least one on each side of each rotation axis and thus stabilizes the outer frame by only generating upward forces.

The rotational coupling 26, 30 of the gimbal system 6 may have various configurations. In the embodiments of FIGS. 4-6, the inner frame 2 on which the inner propulsion system 4 is mounted, is in a form of a beam that extends through a rotation joint 29 forming the rotational couplings 26, 30 of the gimbal system. The beam may be an essentially straight beam, although in variants it may also have bends or varying diameters along the length thereof. In these embodiments, an outer frame beam 27 extends through the rotation joint 29 orthogonally to the inner frame beam. The outer frame beam 27 may also be an essentially straight beam, although in variants it may also have bends or varying diameters along the length thereof. In the embodiment of FIGS. 4, 4a, the outer frame beam 27 is split while the inner frame beam 2 is continuous, whereas in the embodiment of FIGS. 5, 5a, the outer frame beam 27 is continuous while the inner frame beam 2 is split. The outer frame beam 27 is connected at opposite outer ends to the outer frame 8 such that the inner frame 2 and inner propulsion system 4 can rotate around the first axis A and around the second axis B within the outer frame 8. In order to have great stability and strength, the gimbal frame coupling joint 29 may have first and second rotational couplings 26, 30 that are in offset planes as illustrated in FIGS. 6 and 6a. This allows the inner frame beam 2 and outer frame beam 27 to both extend through the rotation joint 29 uninterrupted. The uninterrupted beams 2, 27 are advantageous not only for structural integrity, but also allow both beams to act as canals for electrical cables, fluidic connections or other functions.

Various components such as surveillance system 16, functional system 18, power source 12, control unit 14 and outer propulsion system 11 may advantageously be mounted at opposed ends of the outer frame beam 27.

In the second general embodiment of the invention, the electrical rotary actuator actuates the coupling between the gimbal and outer frame such that the rotation of the outer frame 8 relative to the inner frame 2 may be controlled. In variants, the electrical rotary actuator may alternatively or in addition actuate the coupling between gimbal frame elements, or between the gimbal 6 and inner frame 2.

The electrical rotary actuator comprises an actuator comprising an electrical motor 44 mounted on one of the frames of the rotational coupling, a rotary output of the actuator coupled to the other frame of the rotational coupling. In an advantageous embodiment, the actuator further comprises a reduction gear assembly coupled to the output of the electrical motor 44, and the electrical motor may for instance be a brushless DC motor that is light weight, typically have a low torque density but a high rotational speed, thus requiring a reduction gear. The reduction gear assembly may however render the transmission non-backdrivable. In the event of a collision with an external object in order to allow rotation of the outer frame relative to the gimbal system and inner frame, the electrical rotary actuator 13 may be provided with a clutch 46 to decouple the frames of the rotational coupling.

The clutch 46 may either be active, to actively decouple when a collision event is sensed or when commanded by an operator, or may be passive, in particular by allowing a slipping of the clutch when a certain amplitude of torque is exceeded. The coupling torque of the passive slip clutch is configured to allow sufficient torque through the coupling for rotation of the outer cage and gimbal elements that are connected together during normal flight operations. In the event of a collision or other event that exceeds the torque threshold for normal operation, the passive clutch is configured to slip. In an embodiment, the clutch 46 may comprise a pair of magnetic discs 48a, 48b that have complementary magnetically polarised portions N, S that align with each other.

In an embodiment with an active clutch, the rotational coupling may be provided with a torque sensor 51. The torque sensor 51, in an embodiment, may comprise a compliant coupling element 52 connected to one plate of the active clutch and to the rotational organ on which that plate is mounted, and sensor 50 to detect a relative displacement of the frame elements due to torque exerted on the compliant element The sensor may for instance comprise an encoder disc 50a and encoder 50b connected to complementary parts of the rotational coupling. In a variant, the sensor may comprise a strain gauge to detect an elastic deformation of the compliant element. Upon exceeding a predetermined torque threshold, for instance in a range of between ¼ and ½ of the maximum torque that can be generated by the inner frame propulsion system, the clutch is electronically activated to unlock the rotational coupling and allow movement of the frame elements relative to each other.

An active or passive clutch can also be used in embodiments comprising outer air propulsion units without a motor or actuator on the rotational coupling. It allows locking the outer frame to the inner frame for standard flights, but to unlock during collision or on command (for an active clutch).

LIST OF REFERENCES USED

UAV 1
inner frame 2
inner propulsion system 4 (flight propulsion system)
propulsion unit 20
motors 22
propellors 24
gimbal system 6
(first gimbal)
first rotational coupling 26
bearing
(second gimbal)
gimbal frame 28
second rotational coupling 30
bearing
rotation joint 29
outer frame 8 (outer protective cage)
outer frame modules
beams 32
suspension system
beam 27 (for coupling to rotation joint 29)
battery support frame element 27'
outer frame actuation system 10
outer propulsion system (first embodiment) 11
propulsion unit 34
motors 36
propellors 38
shroud 40
electrical rotary actuator (second embodiment) 13
actuator 42
motor 44
reduction gear
clutch 46
magnetic discs 48, 48a, 48b
active clutch
torque sensor 51
position sensor 50
compliant coupling element 52
power source 12
battery 12a
control system 14
control unit
wireless communications system
sensors
inertial sensors
navigation/direction sensors
surveillance system 16
camera(s)
functional system 18
robot

The invention claimed is:

1. Unmanned aerial vehicle (UAV) comprising:
an inner frame,
an inner flight propulsion system mounted on the inner frame,
an outer frame forming an outer protective cage that surrounds and protects the inner flight propulsion system, the outer frame having a camera or other sensors for measuring flight parameters and measuring position with respect to external objects,
a gimbal system comprising a gimbal frame and at least two rotational couplings with orthogonal axes coupling the inner propulsion system to the outer frame,
a control system including a wireless communication system for communicating with an external controller for a) remote control of the UAV, b) transmitting data from the camera, and c) transmitting data from the other sensors,
a power source, and
an outer frame actuation system,
wherein the control system and the outer frame actuation system are configured to actively orient the outer frame around at least two axes respect to the inner frame to orient the outer frame according to a shape of an environment or the external objects,
wherein the outer frame actuation system comprises an outer air propulsion system fixed to the outer frame or to the gimbal frame, the inner flight propulsion system configured to enable the UAV to hover and fly without thrust from the outer propulsion system, and
wherein the control system and the outer frame actuation system are configured to actively orient the outer frame around the at least two axes with respect to the inner frame to move into a desired orientation such that the camera or other sensors are oriented in a certain direction or keep in a stable orientation with respect to the external objects.

2. UAV according to claim 1, wherein the outer air propulsion system comprises a plurality of propulsion units comprising propellers or turbines driven by motors controlled by the control system to govern the orientation of the outer frame with respect to the inner frame.

3. UAV according to claim 2, wherein the propulsion units that are positioned proximate but offset laterally from a gimbal axis coupled rotationally to the outer frame.

4. UAV according to claim 2, wherein at least one of the propulsion units is reversible and controllable to generate forward or reverse thrust.

5. UAV according to claim 2, wherein the outer frame propulsion units are tilted so as generate thrust in a direction forming an acute angle with the vertical direction during stable flight, configured to control orientation of the outer frame around a Yaw axis.

6. UAV according to claim 1, wherein the outer air propulsion system comprises propulsion units fixed to a frame of the gimbal system, the frame coupled to the outer frame via one of said rotational couplings.

7. UAV according to claim 1, wherein the outer air propulsion system comprises at least two propulsion units, at least one propulsion unit mounted proximate each rotational coupling connecting the outer frame to the gimbal frame.

8. UAV according to claim 1, wherein the outer air propulsion system is configured to generate lift in conjunction with the inner propulsion system for the flight of the UAV.

9. UAV according to claim 1, wherein at least one of said rotational couplings connecting the outer frame to a gimbal frame further comprises a clutch configured to block rotation of the outer frame with the gimbal frame and to allow decoupling of the outer frame from the gimbal frame.

10. UAV according to claim 1, wherein at least one of said rotational couplings further comprises an electrical rotary actuator to actively orient the inner frame relative to the outer frame.

11. UAV according to claim 10 wherein the inner propulsion system has a single propulsion unit.

12. UAV according to claim 1 wherein the inner propulsion system comprises a plurality of propulsion units.

13. Unmanned aerial vehicle (UAV) comprising:
an inner frame,
an inner flight propulsion system mounted on the inner frame,
an outer frame forming an outer protective cage that surrounds and protects the inner flight propulsion system, the outer frame having a camera or other sensors for measuring flight parameters and measuring position with respect to external objects,
a gimbal system comprising a gimbal frame and at least two rotational couplings with orthogonal axes coupling the inner propulsion system to the outer frame,
a control system, including a wireless communication system for communicating with an external controller for a) remote control of the UAV, b) transmitting data from the camera, and c) transmitting data from the other sensors,
a power source, and
an outer frame actuation system,
wherein the control system and the outer frame actuation system are configured to actively orient the outer frame with respect to the inner frame to orient the outer frame according to a shape of an environment or the external objects,
wherein the outer frame actuation system comprises an electrical rotary actuator mounted on one or more rotational couplings coupling the outer frame to the gimbal frame of the gimbal system, and a clutch to allow decoupling of the outer frame from the gimbal frame, and
wherein the control system and the outer frame actuation system are configured to actively orient the outer frame around at least two axes with respect to the inner frame to move into a desired orientation such that the camera or other sensors are oriented in a certain direction or keep in a stable orientation with respect to the external objects.

14. UAV according to claim 13 wherein the clutch is electronically activated.

15. UAV according to claim 13 wherein at least one rotational coupling comprises a torque sensor to sense a collision event.

16. UAV according to claim 13 wherein the clutch is passive and configured to slip when a certain amplitude of torque is exceeded.

17. UAV according to claim 1, wherein the outer propulsion system is mounted inside the outer protective cage formed by the outer frame.

18. UAV according to claim 1, wherein components of the UAV are mounted at opposite ends of a long axis A, said components including any one or more of a surveillance system, a functional system, sensors, lighting, elements of the control system, elements of the power source.

19. UAV according to claim 1, further comprising a surveillance system comprising any one or more of camera, a distance sensor, a lighting system, mounted to the outer frame.

20. UAV according to claim 1, further comprising a functional system comprising any one or more of a robotic gripper or object manipulator, an electromagnet, a sensing probe, a fluid dispenser, a sample collector, is mounted to the outer frame.

21. UAV according to claim 1, wherein the gimbal system comprises a rotation joint, the inner frame comprising a beam coupled rotationally to the rotation joint forming a first of said forming said two rotational couplings, a second beam coupled rotationally to the rotation joint forming a second of said two rotational couplings, the second beam constituting part of the outer frame or part of the gimbal system.

22. UAV according to claim 1, wherein the inner frame beam extends uninterrupted through the rotation joint and the second beam extends uninterrupted through the rotation joint.

23. UAV according to claim 1, wherein the power source comprises a battery, and the outer frame comprise a battery mounting frame with an adjustable battery mounting position on an opposite side of a rotation coupling from a functional system or payload to change the position of the battery along the battery mounting beam and thus adjust the center of mass of the outer frame.

24. UAV according to claim 1, wherein the outer frame has the camera and other sensors for measuring flight parameters and measuring position with respect to external objects,
wherein the control system and the outer frame actuation system are configured to actively orient the outer frame around the at least two axes with respect to the inner frame to move into a desired orientation such that the camera and other sensors are oriented in a certain direction or keep in a stable orientation with respect to the external objects, and
wherein the control system and the outer frame actuation system are also configured to actively orient the outer frame around the at least two axes with respect to the inner frame to navigate the UAV according to a shape of an environment and the external objects.

25. UAV according to claim 1, wherein the control system and the outer frame actuation system are configured to actively orient the outer frame around the at least two axes with respect to the inner frame in case of a collision with the external object and whenever fee rotation of the outer frame relative to the inner frame is desired.

26. UAV according to claim 13, wherein the outer frame has the camera and other sensors for measuring flight parameters and measuring position with respect to external objects,
wherein the control system and the outer frame actuation system are configured to actively orient the outer frame around the at least two axes with respect to the inner frame to move into a desired orientation such that the camera and other sensors are oriented in a certain direction or keep in a stable orientation with respect to the external objects, and
wherein the control system and the outer frame actuation system are also configured to actively orient the outer frame around the at least two axes with respect to the inner frame to navigate the UAV according to a shape of an environment and the external objects.

27. UAV according to claim 13, wherein the control system and the outer frame actuation system are configured to actively orient the outer frame around the at least two axes with respect to the inner frame in case of a collision with the external object and whenever fee rotation of the outer frame relative to the inner frame is desired.

\* \* \* \* \*